US012794525B2

(12) United States Patent
Kim et al.

(10) Patent No.: US 12,794,525 B2
(45) Date of Patent: Nov. 10, 2026

(54) ELECTRONIC DEVICE INCLUDING ANTENNA

(71) Applicant: Samsung Electronics Co., Ltd., Suwon-si (KR)

(72) Inventors: Dongyeon Kim, Suwon-si (KR); Youngsang Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 18/660,858

(22) Filed: May 10, 2024

(65) Prior Publication Data

US 2025/0047341 A1 Feb. 6, 2025

Related U.S. Application Data

(63) Continuation of application No. PCT/KR2024/005636, filed on Apr. 25, 2024.

(30) Foreign Application Priority Data

Aug. 4, 2023 (KR) ........................ 10-2023-0102494
Nov. 8, 2023 (KR) ........................ 10-2023-0153484

(51) Int. Cl.
*H04B 7/06* (2006.01)
*H01Q 21/24* (2006.01)
*H04B 1/401* (2015.01)

(52) U.S. Cl.
CPC ............. *H04B 7/061* (2013.01); *H01Q 21/24* (2013.01); *H04B 1/401* (2013.01)

(58) Field of Classification Search
CPC .......... H04B 7/061; H04B 1/401; H04B 1/40; H04B 7/06; H04B 7/08; H04B 17/309;
(Continued)

(56) References Cited

U.S. PATENT DOCUMENTS 8,165,637 B2 4/2012 Park et al.
9,778,368 B2 10/2017 Krantz et al.
(Continued)

FOREIGN PATENT DOCUMENTS

CN 110398754 A 11/2019
CN 113629408 A 11/2021
(Continued)

OTHER PUBLICATIONS

International Search Report with English translation and Written Opinion dated Aug. 13, 2024; International Appln. No. PCT/KR2024/005636.

(Continued)

*Primary Examiner* — Lana N Le
(74) *Attorney, Agent, or Firm* — Jefferson IP Law, LLP

(57) ABSTRACT

An electronic device is provided. The electronic device includes at least one processor, memory storing instructions, a first antenna, a second antenna, a radio frequency (RF) transceiver, a phase shifter electrically connected to the second antenna, a power branch circuit, and at least one switch circuit configured to selectively provide a first connection state or a second connection state. The instructions that, when executed by the at least one processor, cause the electronic device to control the at least one switch circuit to provide a first connection state or a second connection state.

20 Claims, 20 Drawing Sheets

(58) Field of Classification Search
CPC ........ H04B 1/00; H04B 17/12; H04B 1/0064; H04B 17/336; H04B 17/328; H04B 7/0602; H04B 7/0825; H04B 7/0828; H04B 7/0608; H01Q 21/24; H01Q 1/24; H01Q 21/28; H04M 1/02; H04W 84/06; H04W 72/542; H04W 88/06; H04W 76/15
See application file for complete search history.

(56) References Cited

U.S. PATENT DOCUMENTS

| | | | | |
|---|---|---|---|---|
| 10,135,478 | B2 | 11/2018 | Chi et al. | |
| 11,171,682 | B2 | 11/2021 | Chi et al. | |
| 11,201,631 | B1 * | 12/2021 | Lee | H04B 1/02 |
| 11,914,050 | B2 | 2/2024 | Iyengar et al. | |
| 2016/0079934 | A1 * | 3/2016 | Ichitsubo | H04B 1/006 |
| 2018/0294832 | A1 * | 10/2018 | Chi | H04B 1/00 |
| 2022/0209583 | A1 | 6/2022 | Pan et al. | |
| 2022/0291395 | A1 | 9/2022 | Iyengar et al. | |
| 2023/0081582 | A1 * | 3/2023 | Moon | H04B 1/401 455/571 |
| 2023/0163469 | A1 | 5/2023 | Yun et al. | |
| 2024/0396207 | A1 * | 11/2024 | Won | H01Q 1/247 |

FOREIGN PATENT DOCUMENTS

| | | | |
|---|---|---|---|
| CN | 115084867 | A | 9/2022 |
| CN | 112164893 | A | 12/2023 |
| EP | 4 333 210 | A1 | 3/2024 |
| KR | 10-1028235 | B1 | 4/2011 |
| KR | 10-2021-0025044 | A | 3/2021 |
| KR | 10-2021-0106563 | A | 8/2021 |
| KR | 10-2022-0012065 | A | 2/2022 |
| KR | 10-2022-0146811 | A | 11/2022 |
| KR | 10-2023-0040811 | A | 3/2023 |

OTHER PUBLICATIONS

Extended European search report dated Sep. 2, 2026; European Appln No. 24852002.5-1201.

* cited by examiner

ELECTRONIC DEVICE INCLUDING ANTENNA

CROSS-REFERENCE TO RELATED APPLICATION(S)

This application is a continuation application, claiming priority under § 365(c), of an International application No. PCT/KR2024/005636, filed on Apr. 25, 2024, which is based on and claims the benefit of a Korean patent application number 10-2023-0102494, filed on Aug. 4, 2023, in the Korean Intellectual Property Office, and of a Korean patent application number 10-2023-0153484, filed on Nov. 8, 2023, in the Korean Intellectual Property Office, the disclosure of each of which is incorporated by reference herein in its entirety.

TECHNICAL FIELD

The disclosure relates to an electronic device including an antenna.

BACKGROUND ART

An electronic device may transmit and/or receive a signal through an antenna. The electronic device may include a plurality of conductive portions that at least partially define a side surface of the electronic device. Some of the plurality of conductive portions may operate as an antenna radiator for transmitting and/or receiving a signal. For example, the electronic device may transmit a signal in a satellite communication frequency band through at least a part of the conductive portions. Since satellites are far from the ground, in order to increase satellite communication efficiency, the antenna of the electronic device may be required to have a polarization characteristic corresponding to a polarization characteristic of an antenna of the satellite.

The above information is presented as background information only to assist with an understanding the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device including an antenna.

Additional aspects will be set forth in part in the description which follows and, in part, will be apparent from the description, or may be learned by practice of the presented embodiments.

In accordance with an aspect of the disclosure, an electronic device is provided. The electronic device may include at least one processor comprising processing circuitry. The electronic device may include memory storing instructions being executable by the at least one processor. The electronic device may include a first antenna. The electronic device may include a second antenna. The electronic device may include a radio frequency (RF) transceiver. The electronic device may include a phase shifter electrically connected to the second antenna. The electronic device may include a power branch circuit. The electronic device may include at least one switch circuit configured to selectively provide a first connection state or a second connection state. In the first connections state, a first path may be formed for electrically connecting the RF transceiver, the power branch circuit and the first antenna, and a second path may be formed for electrically connecting the RF transceiver, the power branch circuit, the phase shifter, and the second antenna. In the second connection state, a third path may be formed for electrically connecting the RF transceiver and the first antenna by bypassing the power branch circuit, and a fourth path may be formed for electrically connecting the RF transceiver, the phase shifter, and the second antenna, bypassing the power branch circuit. The instructions, when executed by the at least one processor, may cause the electronic device to control the at least one switch circuit such that the at least one switch circuit provides the first connection state or the second connection state, based on a first receiving quality of a first signal received through the first antenna and the second antenna in the first connection state and a second receiving quality of a second signal received through the first antenna and the second antenna in the second connection state.

In accordance with another aspect of the disclosure, an electronic device is provided. The electronic device may include at least one processor comprising processing circuitry. The electronic device may include memory storing instructions being executable by the at least one processor. The electronic device may include a housing including a first housing part and a second housing part rotatably coupled to the first housing part. The electronic device may include a frame defining at least a part of a side surface of the first housing part. The electronic device may include a first antenna at least partially formed along a first edge portion of the frame. The electronic device may include a second antenna at least partially formed along a second edge portion of the frame perpendicular to the first edge portion. The electronic device may include a radio frequency (RF) transceiver. The electronic device may include a phase shifter electrically connected to the second antenna. The electronic device may include a power branch circuit. The electronic device may include at least one switch circuit configured to selectively provide a first connection state or a second connection state. The instructions, when executed by the at least one processor, may cause the electronic device to control the at least one switch circuit such that the at least one switch circuit provides the first connection state including a first path for electrically connecting the RF transceiver, the power branch circuit and the first antenna, and a second path for electrically connecting the RF transceiver, the power branch circuit, the phase shifter, and the second antenna. The instructions, when executed by the at least one processor, may cause the electronic device to control the at least one switch circuit such that the at least one switch circuit provides the second connection state including a third path for electrically connecting the RF transceiver and the first antenna by bypassing the power branch circuit, and a fourth path for electrically connecting the RF transceiver, the phase shifter, and the second antenna, bypassing the power branch circuit.

In accordance with another aspect of the disclosure, a method performed by an electronic device is provided. The method may include controlling, while transmitting a signal to an external electronic device, at least one switch circuit to a first connection state forming a first path for electrically connecting an RF transceiver, a power branch circuit and a first antenna, and a second path for electrically connecting the RF transceiver, the power branch circuit, a phase shifter, and a second antenna. The method may include identifying a first receiving quality of a first signal received through the first antenna and the second antenna in the first connection state, based on identifying transmission of the signal. The method may include controlling at least one switch circuit to a second connection state forming a third path for electrically connecting the RF transceiver and the first antenna by bypassing the power branch circuit, and a fourth path for electrically connecting the RF transceiver, the phase shifter, and the second antenna, bypassing the power branch circuit. The method may include identifying a second receiving quality of a second signal received through the first antenna and the second antenna in the second connection state. The method may include controlling the at least one switch circuit such that the at least one switch circuit provides the first connection state or the second connection state based on the first receiving quality and the second receiving quality.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
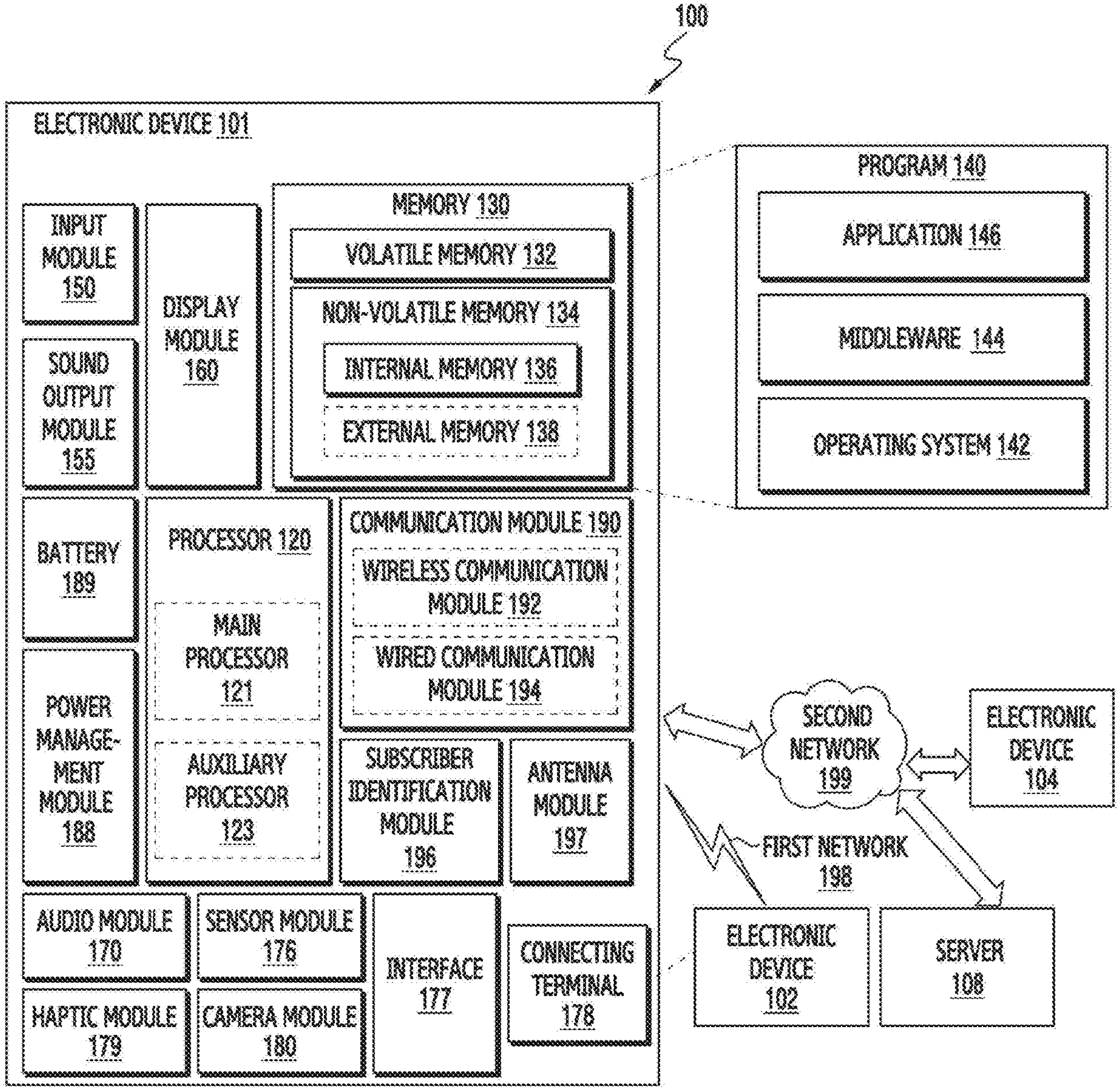
FIG. 1 is a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device 101 may include an antenna (e.g., a first antenna 210 and a second antenna 220 of FIG. 2) for communication with an external electronic device. For example, the electronic device 101 may transmit a signal to an external electronic device or receive a signal from the external electronic device, by using antennas 210 and 220. For example, the electronic device 101 may include a plurality of antennas 210 and 220 to implement communication diversity. For example, the electronic device 101 may include the first antenna 210 and the second antenna 220, but it is not limited thereto.

Figure 2:
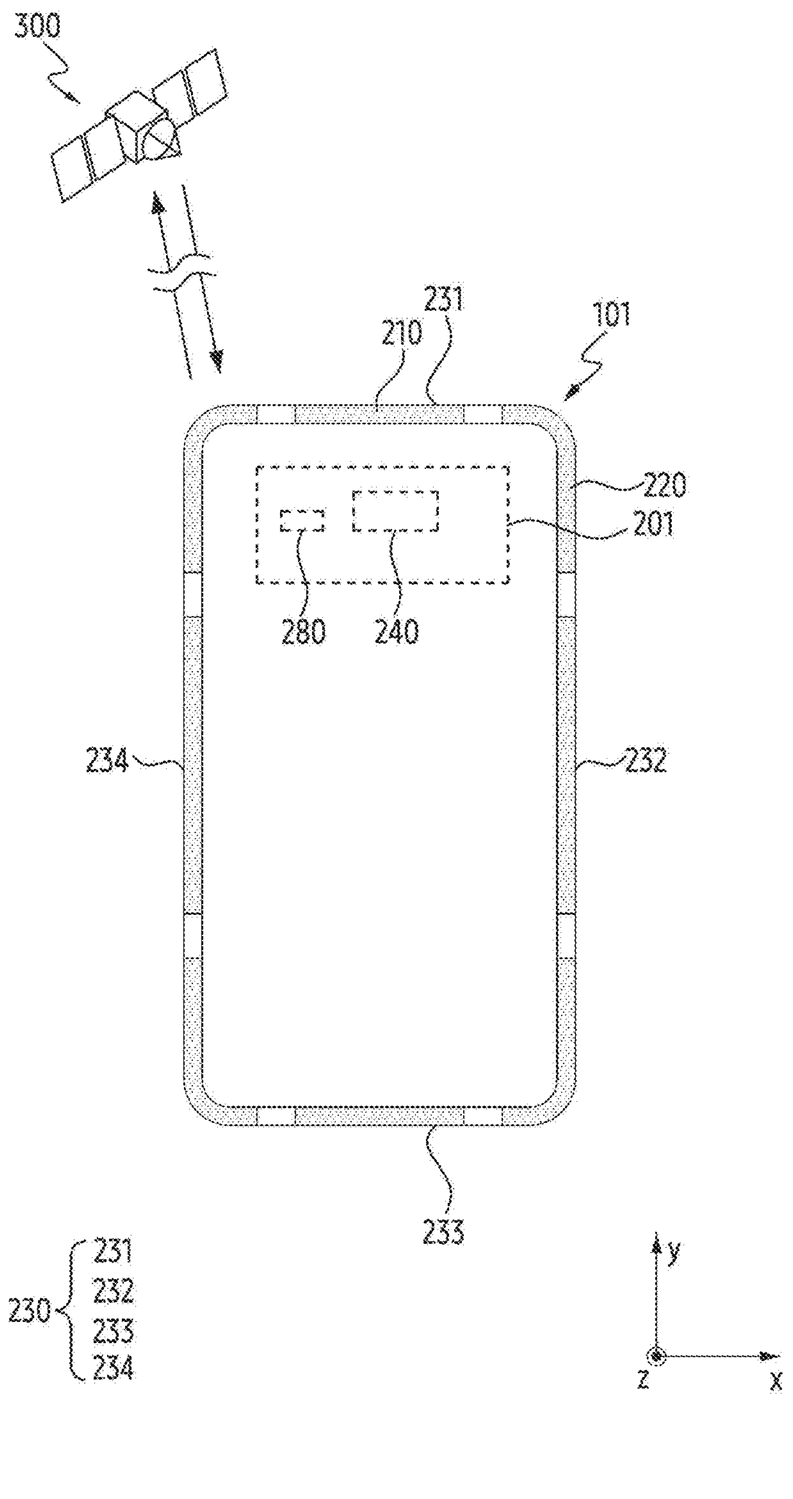
FIG. 2 schematically illustrates an electronic device according to an exemplary embodiment.

For example, the external electronic device may include a satellite (e.g., a satellite 300 of FIG. 2). For example, the electronic device 101 may be configured to perform satellite communication that receives a signal from a satellite or transmits a signal to a satellite. The orbit of the satellite 300 may be located hundreds to tens of thousands of kilometers above the ground where the electronic device 101 is located. Since a distance between the electronic device 101 and the satellite 300 is long, radiation efficiency may be low. For example, in order to increase satellite communication efficiency, a polarization characteristic of the first antenna 210 and the second antenna 220 may be required to correspond to a polarization characteristic of an antenna of the satellite 300.

For example, the polarization characteristic of the antenna of the satellite 300 may be a circular polarization characteristic. According to an exemplary embodiment, the electronic device 101 may implement circular polarization by adjusting an electrical path between the first and second antennas 210 and 220 for communication diversity and the RF transceiver 250. As the first antenna 210 and the second antenna 220 radiate circular polarization, satellite communication efficiency may be improved. Hereinafter, the electronic device 101 according to an exemplary embodiment is introduced.

FIG. 2 schematically illustrates an electronic device according to an exemplary embodiment.

Referring to FIG. 2, according to an embodiment, an electronic device 101 may include a first antenna 210 and a second antenna 220. For example, the first antenna 210 and the second antenna 220 may be referred to as the antenna module of FIG. 1 (e.g., the antenna module 197 of FIG. 1). For example, the first antenna 210 and the second antenna 220 may be used to transmit and/or receive a signal on a designated frequency band.

For example, the electronic device 101 may transmit a signal according to transmission diversity using the first antenna 210 and the second antenna 220. For example, the electronic device may receive a signal according to reception diversity using the first antenna 210 and the second antenna 220. For example, the electronic device 101 may implement a diversity function by using a signal transmitted and received through the first antenna 210 and the second antenna 220. For example, the first antenna 210 may operate as a primary antenna, and the second antenna 220 may operate as a diversity antenna. However, it is not limited thereto. For example, the electronic device 101 may include at least one additional antenna, in addition to the first antenna 210 and the second antenna 220 illustrated in FIG. 2.

For example, the electronic device 101 may include a frame 230. For example, the frame 230 may be referred to as a frame defining at least a part of a side surface of the electronic device 101. For example, when the electronic device 101 has a substantially rectangular shape, the frame 230 may include a first edge portion 231, a second edge portion 232, a third edge portion 233, and a fourth edge portion 234.

For example, the first antenna 210 and the second antenna 220 may be formed along a part of the frame 230. The frame 230 may include a conductive portion and a non-conductive portion. The conductive portion may operate as an antenna radiator for transmitting and/or receiving a signal on a designated frequency band. The non-conductive portion may be in contact with both ends of conductive portions operating as the antenna radiator in order to electrically isolate the conductive portion operating as an antenna radiator from another conductive portion. For example, the non-conductive portion may include polycarbonate (PC), but is not limited thereto. The non-conductive portion, which is a dielectric, may limit a length of the conductive portion operating as an antenna radiator.

For example, the frame 230 may include a first edge portion 231 defining at least a part of a top (e.g., +y direction) edge of the electronic device 101, a second edge portion 232 defining at least a part of one side (e.g., +x direction) edge of the electronic device 101, a third edge portion 233 opposite to the first edge portion 231, and a fourth edge portion 234 opposite to the second edge portion 232. For example, the first edge portion 231 may be perpendicular to the second edge portion 232. For example, a length of the second edge portion 232 may be longer than a length of the first edge portion 231. For example, the third edge portion 233 may define at least a part of a bottom (e.g., −y direction) edge of the electronic device 101. For example, the fourth edge portion 234 may define at least a part of the other side (e.g., −y direction) edge of the electronic device 101.

For example, the first antenna 210 may be disposed substantially perpendicular to the second antenna 220. For example, the first antenna 210 may be at least partially formed along the first edge portion 231 or the third edge portion 233. For example, the second antenna 220 may be at least partially formed along the second edge portion 232 or the fourth edge portion 234. Since the first edge portion 231 and the third edge portion 233 are perpendicular to the second edge portion 232 and the fourth edge portion 234, the first antenna 210 and the second antenna 220 may be disposed perpendicularly to each other. However, it is not limited thereto. For example, the first antenna 210 may be at least partially formed along the second edge portion 232 or the fourth edge portion 234, and the second antenna 220 may be at least partially formed along the first edge portion 231 or the third edge portion 233. In order to implement circular polarization according to an embodiment of the disclosure, the first antenna 210 and the second antenna 220 merely have structures disposed perpendicularly to each other, and locations of the first antenna 210 and the second antenna 220 are not limited to specific locations.

'An antenna being at least partially formed along an edge portion' may indicate that an antenna (e.g., an antenna radiator) may be formed along the edge portion as a whole, or most of the antenna may be formed along the edge portion, and a remaining part of the antenna may be formed along another edge portion different from the edge portion.

For example, as shown in FIG. 2, the second antenna 220 may include an edge of the frame 230. For example, a part of the second antenna 220 may be formed along the second edge portion 232, and a remaining part of the second antenna 220 may be formed along the first edge portion 231. Since the part of the second antenna 220 formed along the second edge portion 232 is larger than the remaining part of the second antenna 220 formed along the first edge portion 231, the second antenna 220 may be referred to as being substantially formed along the second edge portion 232. Since the part of the second antenna 220 is perpendicular to the first antenna 210 even when the other part of the second antenna 220 is parallel to the first antenna 210, the second antenna 220 may be referred to as being perpendicularly disposed to the first antenna 210. For example, the first antenna 210 and the second antenna 220 formed in the frame 230 may be inverted-F antenna (IFA).

For example, the first antenna 210 and the second antenna 220 may transmit and/or receive a signal through a cellular network transmitting and/or receiving a signal using a ground-based base station. The first antenna 210 and the second antenna 220 used for cellular communication may be configured to radiate linear polarization. For example, the first antenna 210 and the second antenna 220 implemented as IFA may have a linear polarization characteristic including a radiation pattern polarized in a vertical or horizontal direction with respect to a propagation direction.

For example, the electronic device 101 may use the first antenna 210 and the second antenna 220 used for cellular communication for satellite communication. For example, the electronic device 101 may transmit and/or receive a signal in a satellite communication frequency band (e.g., about 1.6 GHZ) by using the first antenna 210 and the second antenna 220.

For example, a receive power received through an antenna may be calculated based on Equation 1 below.

$$P_R = (PLF)\cdot\frac{P_T G_T G_R c^2}{(4\pi R f)^2} \qquad \text{Equation 1}$$

(PT: transmit power, GT: gain of transmission antenna, GR: gain of reception antenna, R: distance, f: frequency, PLF: polarization loss factor)

Referring to Equation 1, the receive power may depend on the PLF. The PLF is an index indicating power loss due to a difference in polarization characteristics between the transmission antenna and the reception antenna. When a polarization characteristic of the transmission antenna match a polarization characteristic of the reception antenna, the PLF may be '1'. When the polarization characteristic of the transmission antenna and the polarization characteristic of the reception antenna are fully mismatched, the PLF may be '0'. In order to increase communication efficiency, the correlation between the polarization characteristic of the transmission antenna and the polarization characteristic of the reception antenna may be required.

Since a circular polarization signal have less propagation loss than a linear polarization signal, the circular polarization signal may be suitable for long-distance communication. Since the satellite 300 is located hundreds to tens of thousands of kilometers above the ground where the electronic device 101 is located, an antenna of the satellite 300 may have a circular polarization characteristic in order to reduce signal loss. For example, the antenna of the satellite 300 may be configured to radiate right handed circular polarization (RHCP), in order to increase the efficiency of satellite communication. When the antenna of the electronic device 101 performing satellite communication has a circular polarization characteristic, since it matches the polarization characteristic of the antenna of the satellite 300, the satellite communication efficiency of the electronic device 101 may be improved.

As described above, the first antenna 210 and the second antenna 220 used for cellular communication may have the linear polarization characteristic, and the antenna of the satellite 300 may have the circular polarization (e.g., RHCP) characteristic. According to Equation 1, the satellite communication efficiency of the first antenna 210 and the second antenna 220 may be deteriorated due to the difference in polarization characteristics. The electronic device 101 may include at least one switch circuit 280 for adjusting an electrical path and at least one processor 240 configured to control the at least one switch circuit 280 so that the first antenna 210 and the second antenna 220 radiate circular polarization (e.g., RHCP) to improve satellite communication performance. For example, the at least one processor 240 and the at least one switch circuit 280 may be disposed on a printed circuit board 201.

The at least one processor 240 may be configured to control an operation of the electronic device 101. Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphics processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 3:
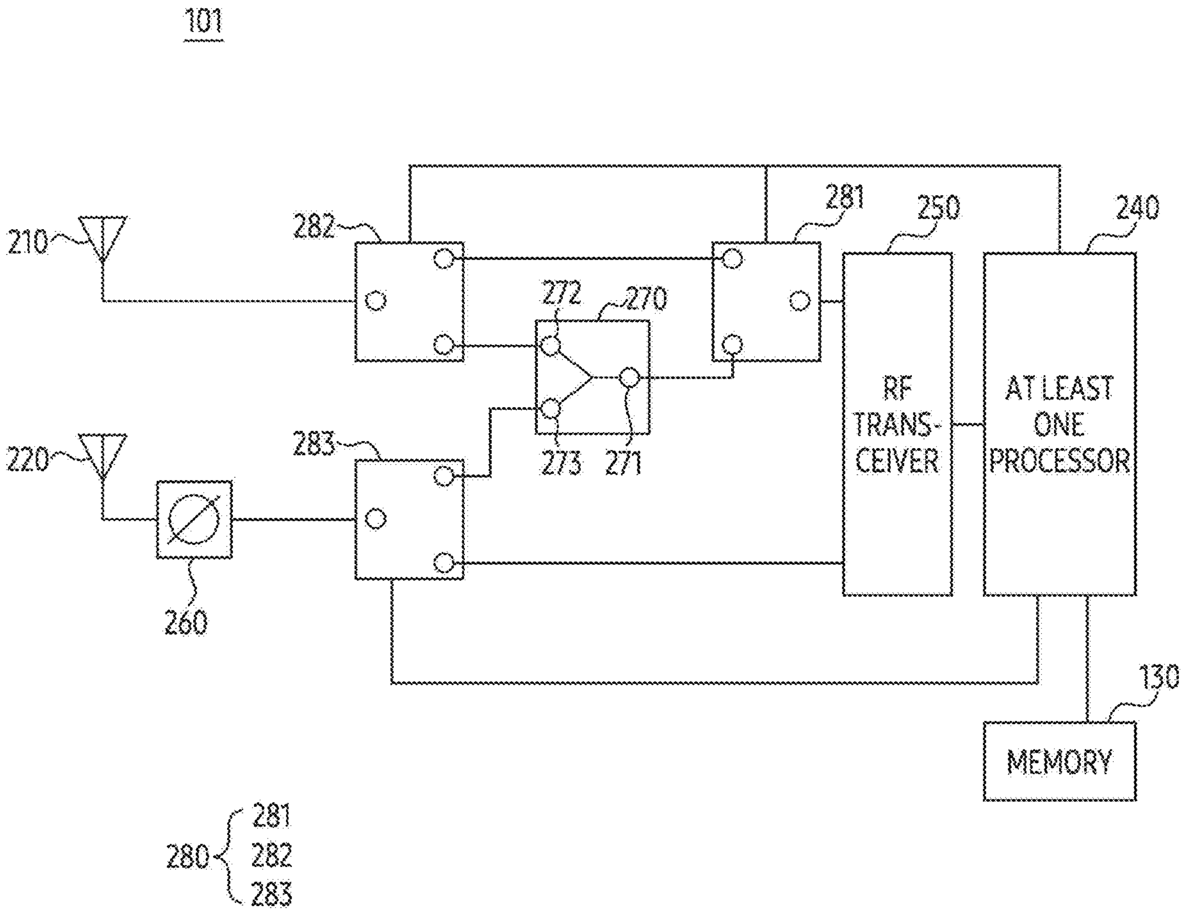
FIG. 3 is a simplified block diagram of an electronic device according to an exemplary embodiment.

FIG. 3 is a simplified block diagram of an electronic device according to an exemplary embodiment.

Referring to FIG. 3, according to an exemplary embodiment, an electronic device 101 may include at least one processor 240, memory 130, a first antenna 210, a second antenna 220, an RF transceiver 250, a phase shifter 260, a power branch circuit 270, and at least one switch circuit 280.

For example, the at least one processor 240 may include at least one of an application processor (AP) (e.g., the main processor 121 of FIG. 1) or a communication processor (CP) (e.g., the auxiliary processor 123 of FIG. 1).

For example, the at least one processor 240 may generate a baseband signal. The at least one processor 240 may control the RF transceiver 250 to process the generated baseband signal. The at least one processor 240 may control the RF transceiver 250 so that a transmission signal is transmitted through the first antenna 210 and the second antenna 220. The at least one processor 240 may control the RF transceiver 250 so that the transmission signal is transmitted in a frequency band communicable with an external electronic device. For example, a frequency band in which the transmission signal is transmitted may be a satellite communication frequency band (e.g., about 1.6 GHZ).

For example, the at least one processor 240 may be configured to control the at least one switch circuit 280. The at least one processor 240 may be configured to control an electrical path between the RF transceiver 250 and the first antenna 210 and an electrical path between the RF transceiver 250 and the second antenna 220 by controlling the at least one switch circuit 280. Adjustment of an electrical path through controlling of the at least one switch circuit 280 will be described later with reference to FIGS. 4A and 4C.

For example, the RF transceiver 250 may be implemented as a single chip (e.g., RFIC chip) or a part of a single package. The RF transceiver 250 may include a digital to analog converter (DAC) for converting a digital signal into an analog signal. The RF transceiver 250 may include a mixer and an oscillator (e.g., local oscillator (LO)) for up-conversion. The RF transceiver 250 may convert a baseband signal generated by the at least one processor 240 into an RF signal. The RF transceiver 250 may include an analog to digital converter (ADC) for converting an analog signal into a digital signal. The RF transceiver 250 may include a mixer and an oscillator for down-conversion. The RF transceiver 250 may convert the RF signal received from the first antenna 210 and the second antenna 220 into a baseband signal so that it may be processed by the at least one processor 240.

For example, the memory 130 may store instructions executable by the at least one processor 240. The instructions, when being executed by the at least one processor 240, may cause the electronic device 101 to perform an operate (e.g., operation of FIG. 8 and/or operation of FIG. 9A).

For example, the phase shifter 260 may be configured to adjust a phase of a signal. For example, the phase shifter 260 may be implemented as a circuit including a passive element such as capacitor, inductor, and/or resistive element. However, it is not limited thereto. The phase shifter 260 may be implemented as a circuit including an active element such as transistor and/or integrated circuit. For example, the phase shifter 260 may cause a phase difference between a signal before passing through the phase shifter 260 and the signal after passing through the phase shifter 260. For example, when the signal passes through the phase shifter 260, a phase of the signal is delayed by the phase shifter 260, thereby causing the phase difference. For example, the signal after passing through the phase shifter 260 may have a phase difference of 90 degrees or 270 degrees compared to the signal before passing through the phase shifter 260.

For example, the power branch circuit 270 may be a three-port passive element. For example, each of three ports 271, 272, and 273 may be connected by an electrical path having a characteristic impedance of 50 ohm. For example, a signal inputted through the port 271 may be distributed to have equal power and output to the port 272 and the port 273. For example, the signal inputted to the port 272 and the port 273 may be combined into one signal and output to the port 271. The power branch circuit 270 may be referred to as a divider, a splitter, and/or a coupler. For example, a transmission signal transmitted from the RF transceiver 250 may be provided to each of the first antenna 210 and the second antenna 220 by being distributed through the power branch circuit 270. For example, a reception signal received through the first antenna 210 and the second antenna 220 from an external electronic device may be provided to the RF transceiver 250 by being combined through the power branch circuit 270.

For example, the phase shifter 260 may be electrically connected to the second antenna 220. As the phase shifter 260 is electrically connected to the second antenna 220, a signal provided to the second antenna 220 and a signal received from the second antenna 220 may pass through the phase shifter 260. When passing through the phase shifter 260, a phase delay of the signals may occur. For example, the phase shifter 260 may be electrically disconnected from the first antenna 210. For example, a signal provided to the first antenna 210 and a signal received from the first antenna 210 may not pass through the phase shifter 260.

For example, the at least one switch circuit 280 may be configured to provide an electrical path (e.g., a first path P1 of FIG. 4A and a third path P3 of FIG. 4C) between the RF transceiver 250 and the first antenna 210 and an electrical path (e.g., a second path P2 of FIG. 4A and a fourth path P4 of FIG. 4C) between the RF transceiver 250 and the second antenna 220. For example, the at least one switch circuit 280 may be configured to selectively provide a first connection state or a second connection state, by being controlled by the at least one processor 240. Instructions stored in the memory 130, when being executed by the at least one processor 240, may cause the electronic device 101 to control the at least one switch circuit 280. For example, the at least one switch circuit 280 may include a first switch circuit 281, a second switch circuit 282, and a third switch circuit 283.

For example, the at least one switch circuit 280 may form an electrical path passing through the power branch circuit 270 by being controlled to the first connection state. The electrical path passing through the power branch circuit 270 may be referred to as a path in which the power branch circuit 270 is included on an electrical path between the RF transceiver 250 and the first antenna 210, and the power branch circuit 270 is included on an electrical path between the RF transceiver 250 and the second antenna 220. The electrical path passing through the power branch circuit 270 may cause the first antenna 210 and the second antenna 220 to radiate circular polarization. For example, the first connection state may be referred to as a circular polarization mode. An operation in which the first antenna 210 and the second antenna 220 radiate the circular polarization in the first connection state will be described later with reference to FIGS. 4A and 4B.

For example, the at least one switch circuit 280 may form an electrical path bypassing the power branch circuit 270 by being controlled to the second connection state. The electrical path bypassing the power branch circuit 270 may be referred to as a path in which the power branch circuit 270 is not included on the electrical path between the RF transceiver 250 and the first antenna 210 and the power branch circuit 270 is not included on the electrical path between the RF transceiver 250 and the second antenna 220. The electrical path bypassing the power branch circuit 270 may cause the first antenna 210 and the second antenna 220 to radiate linear polarization. For example, the second connection state may be referred to as a linear polarization mode or a diversity mode. An operation in which the first antenna 210 and the second antenna 220 radiate the linear polarization in the second connection state will be described later with reference to FIG. 4B.

According to an embodiment, the electronic device 101 may adjust an electrical path to improve the satellite communication efficiency while performing satellite communication. For example, when the electronic device 101 transmits a signal to the satellite 300, the at least one switch circuit 280 may be configured to selectively provide the first connection state or the second connection state. For example, when satellite communication efficiency in the first connection state is higher than satellite communication efficiency in the second connection state, the at least one processor 240 may be configured to control the at least one switch circuit 280 to the first connection state. For example, when the satellite communication efficiency in the second connection state is higher than the satellite communication efficiency in the first connection state, the at least one processor 240 may be configured to control the at least one switch circuit 280 to the second connection state.

Figure 4A:
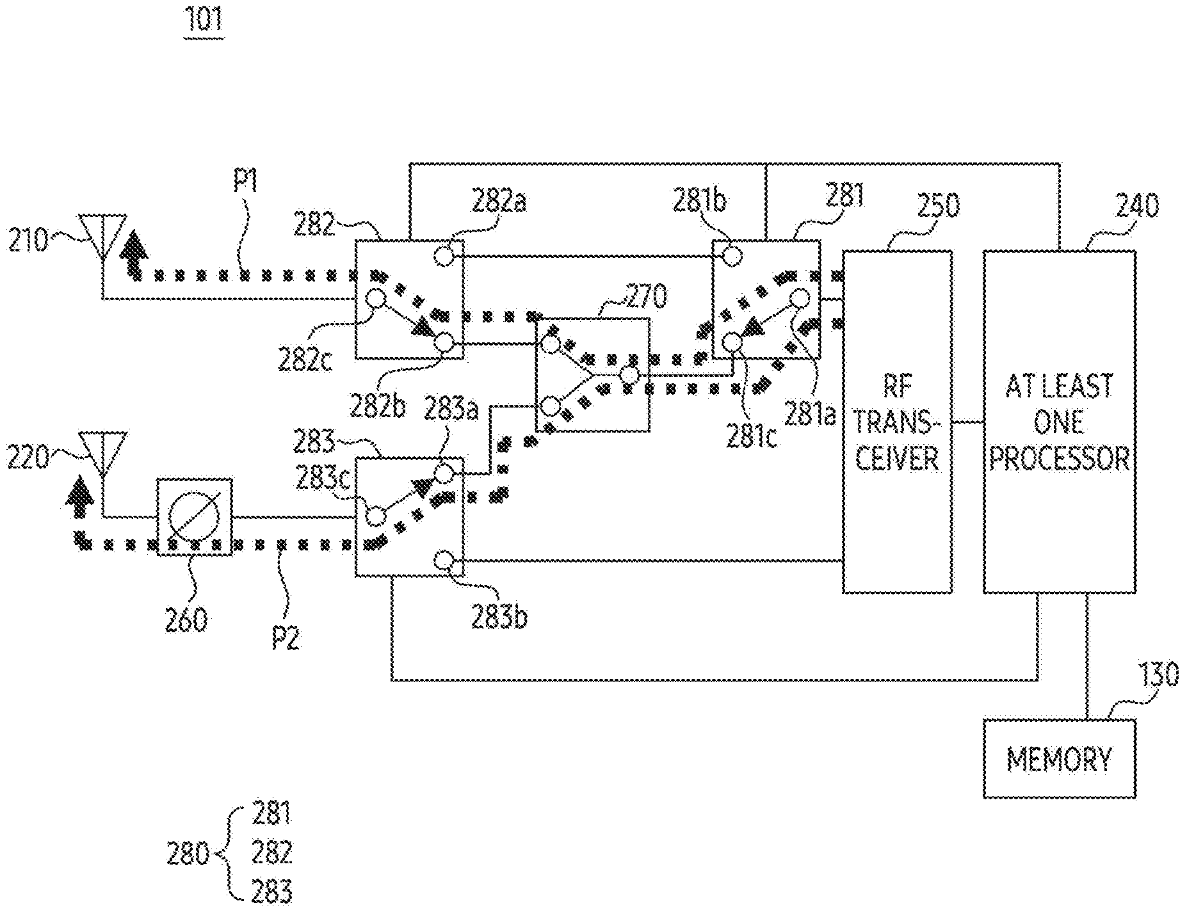
FIG. 4A illustrates an electrical path within a first connection state.
Figure 4B:
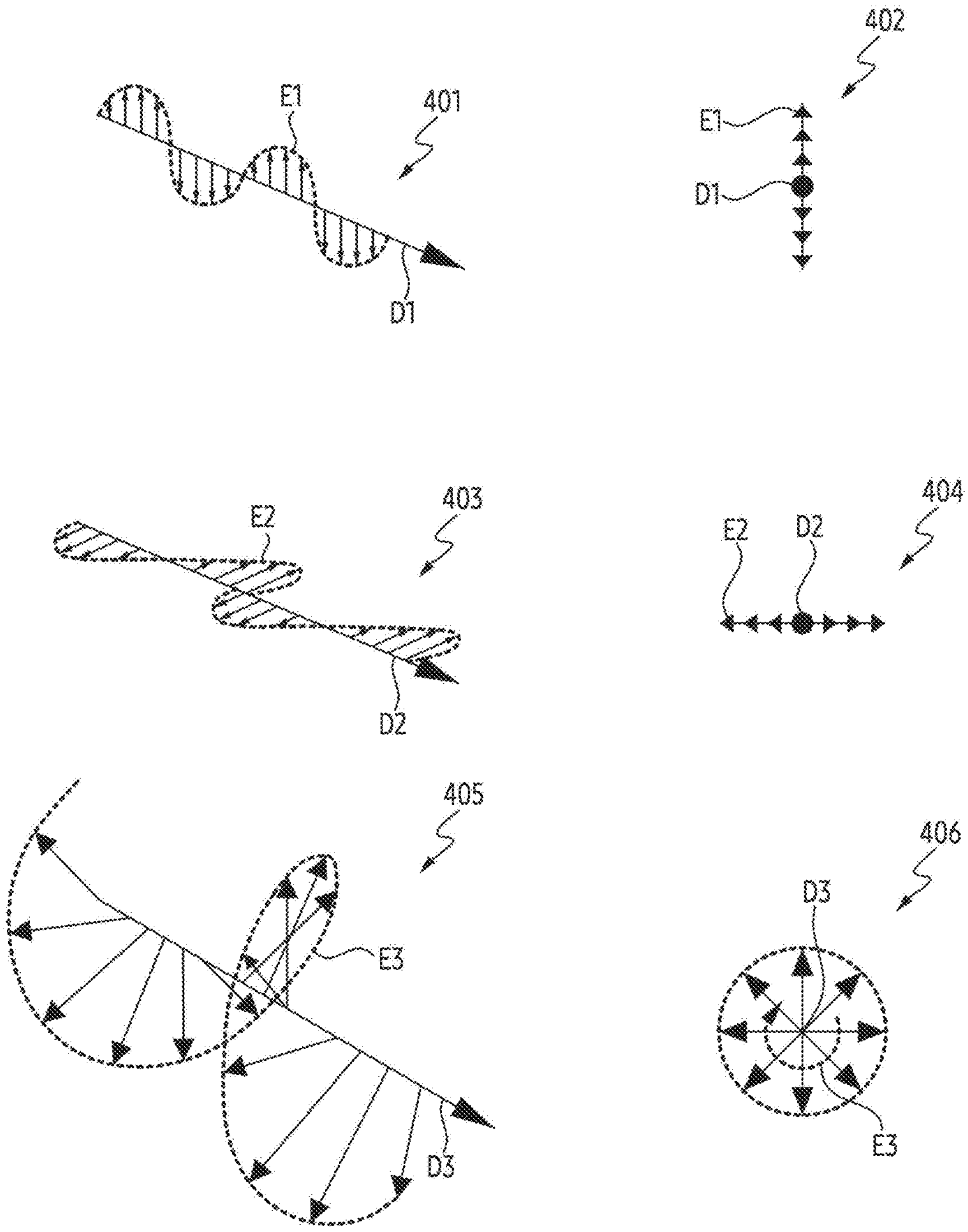
FIG. 4B illustrates polarization radiated from a first antenna and a second antenna.
Figure 4C:
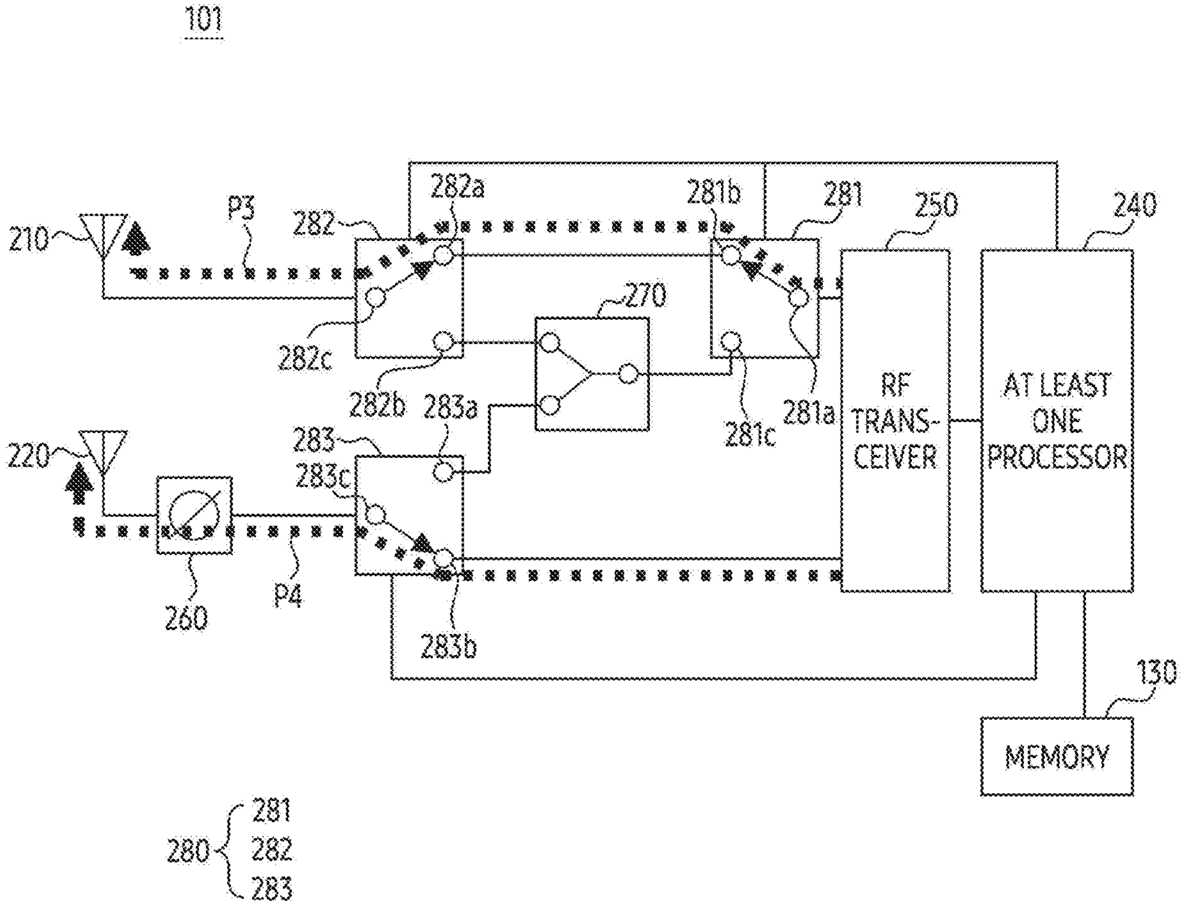
FIG. 4C illustrates an electrical path within a second connection state.

FIG. 4A illustrates an electrical path within a first connection state. FIG. 4B illustrates polarization radiated from a first antenna and a second antenna. FIG. 4C illustrates an electrical path within a second connection state.

Referring to FIG. 4A, an electrical path passing through the power branch circuit 270 may be formed in the first connection state. For example, a first path P1 and a second path P2 may be formed in the first connection state.

For example, the first path P1 may be an electrical path between the RF transceiver 250 and the first antenna 210 in the first connection state. For example, the first path P1 may be an electrical path for electrically connecting the RF transceiver 250, the power branch circuit 270, and the first antenna 210. For example, in the first connection state, a transmission signal provided from the RF transceiver 250 to the first antenna 210 may be provided along the first path P1. The transmission signal may be provided to the first antenna 210 by being branched by the power branch circuit 270.

For example, the second path P2 may be an electrical path between the RF transceiver 250 and the second antenna 220 in the first connection state. For example, the second path P2 may be an electrical path for electrically connecting the RF transceiver 250, the power branch circuit 270, the phase shifter 260, and the second antenna 220. For example, in the second connection state, a transmission signal provided from the RF transceiver 250 to the second antenna 220 may be provided along the second path P2. The transmission signal may be provided to the second antenna 220 by being branched by the power branch circuit 270 and passing through the phase shifter 260.

For example, in the first connection state, the first antenna 210 and the second antenna 220 may be configured to radiate circular polarization. The transmission signal transmitted from the RF transceiver 250 may be provided to the first antenna 210 and the second antenna 220, by being branched by the power branch circuit 270. A phase of the transmission signal branched by the power branch circuit 270 and provided to the second antenna 220 may be delayed by passing through the phase shifter 260. The electronic device 101 according to an exemplary embodiment may implement circular polarization by having a feeding structure with a phase difference by the phase shifter 260. For example, the phase difference may be 90 degrees or 270 degrees, but is not limited thereto.

For example, in the first connection state, the first antenna 210 and the second antenna 220 may be configured to radiate circular polarization based on a difference between a phase of a signal before passing through the phase shifter 260 and a phase of the signal after passing through the phase shifter 260. The circular polarization may be formed by feeding two linear polarization antennas orthogonal to each other with a phase difference of 90 degrees.

Referring to FIG. 4B, 401 of FIG. 4B illustrates a polarization characteristic of a first antenna (e.g., the first antenna 210 of FIG. 4A) in the first connection state. For example, the polarization characteristic of the first antenna 210 may be a linear polarization characteristic having an electric field vector E1 perpendicular to a progress direction D1 of a radio wave based on a transmission signal that does not pass through a phase shifter (e.g., the phase shifter 260 of FIG. 4A). 402 of FIG. 4B indicates a direction of the electric field vector E1 when looking at an electric field formed by the first antenna 210 in the progress direction D1 of the radio wave provided by the first antenna 210. A direction of the electric field vector E1 of the first antenna 210 may be perpendicular to the progress direction D1 of the radio wave.

403 of FIG. 4B illustrates a polarization characteristic of the second antenna 220 in the first connection state. For example, a transmission signal provided to the second antenna 220 may have a phase difference from a transmission signal provided to the first antenna 210, by passing through the phase shifter 260. For example, a polarization characteristic of the second antenna 220 may be a linear polarization characteristic having an electric field vector E2 parallel to a progress direction D2 of a radio wave based on a transmission signal passing through the phase shifter 260. 404 of FIG. 4B illustrates a direction of the electric field vector E2 when looking at an electric field formed by the second antenna 220 in the progress direction D2 of the radio wave provided by the second antenna 220. A direction of the electric field vector E2 of the second antenna 220 may be horizontal to the progress direction D2 of the radio wave.

405 of FIG. 4B indicates a polarization characteristic of the first antenna 210 and the second antenna 220 formed by synthesizing the polarization characteristics of the first antenna 210 and the polarization characteristics of the second antenna 220 in the first connection state. For example, the polarization characteristics of the first antenna 210 and the second antenna 220 may be a circular polarization characteristic formed by synthesizing two linear polarization perpendicular to each other. 406 of FIG. 4B indicates a direction of an electric field vector E3 when looking at an electric field formed by the first antenna 210 and the second antenna 220 in a progress direction D3 of a radio wave provided by the first antenna 210 and the second antenna 220. The directions of the electric field vector E3 formed by the first antenna 210 and the second antenna 220 may be rotated with respect to the progress direction D3 of the radio wave. For example, the circular polarization may be RHCP. However, it is not limited thereto. For example, according to a polarization characteristic of the satellite 300 with which the electronic device 101 wants to communicate, the circular polarization may be left-handed circular polarization (LHCP).

As described above, in the first connection state, the first antenna 210 and the second antenna 220 may be configured to radiate circular polarization through the power branch circuit 270 and the phase shifter 260. For example, when forming a phase difference according to a difference in the length of the electrical path, a space for forming the electrical path may be required. Since an internal space of the electronic device 101 is limited, it may be difficult to implement circular polarization by forming the phase difference according to the difference in the length of the electrical path. According to an embodiment, the electronic device 101 may implement a circular polarization characteristic of the first antenna 210 and the second antenna 220 for communication diversity, by adjusting the electrical path using the at least one switch circuit 280, and using the power branch circuit 270 and the phase shifter 260.

Referring back to FIG. 4A, the at least one switch circuit 280 may be configured to selectively provide the first connection state or the second connection state. The at least one switch circuit 280 may be controlled by the at least one processor 240. The instructions stored in the memory 130, when being executed by the at least one processor 240, may cause the electronic device 101 to control the at least one switch circuit 280 to provide a first connection state of at least one switch circuit 280. For example, the at least one switch circuit 280 may include a first switch circuit 281, a second switch circuit 282, and a third switch circuit 283.

For example, the first switch circuit 281, the second switch circuit 282, and the third switch circuit 283 may be a single pole double throw (SPDT) switch circuit. For example, the first switch circuit 281, the second switch circuit 282, and the third switch circuit 283 may include three ports.

For example, the first switch circuit 281 may be configured to electrically connect the first antenna 210 or the power branch circuit 270 to the RF transceiver. For example, the first switch circuit 281 may include a first port 281*a* electrically connected to the RF transceiver, a second port 281*b* electrically connected to a fourth port 282*a* of the second switch circuit 282, and a third port 281*c* electrically connected to the power branch circuit 270.

For example, the second switch circuit 282 may be configured to electrically connect the first switch circuit 281 or the power branch circuit 270 to the first antenna 210. For example, the second switch circuit 282 may include the fourth port 282*a* electrically connected to the second port 281*b* of the first switch circuit 281, a fifth port 282*b* electrically connected to the power branch circuit 270, and a sixth port 282*c* electrically connected to the first antenna 210.

For example, the third switch circuit 283 may be configured to electrically connect the RF transceiver 250 or the power branch circuit 270 to the second antenna 220. For example, the third switch circuit 283 may include a seventh port 283*a* electrically connected to the power branch circuit 270, an eighth port 283*b* electrically connected to the RF transceiver 250, and a ninth port 283*c* electrically connected to the second antenna 220.

The first switch circuit 281, the second switch circuit 282, and the third switch circuit 283 illustrated in FIG. 4A indicate the first connection state. In the first connection state, the first path P1 for electrically connecting the RF transceiver 250, the power branch circuit 270, and the first antenna 210 and the second path P2 for electrically connecting the RF transceiver 250, the power branch circuit 270, the phase shifter 260, and the second antenna 220 may be formed through the at least one switch circuit 280.

For example, the at least one processor 240 may be configured to control the switch circuit to provide the first connection state, based on connecting the RF transceiver 250 with the power branch circuit 270 through the first switch circuit 281, connecting the power branch circuit 270 with the first antenna 210 through the second switch circuit 282, and connecting the power branch circuit 270 with the second antenna 220 through the third switch circuit 283.

For example, in the first connection state, the at least one processor 240 may control the first switch circuit 281 so that the first port 281*a* and the third port 281*c* of the first switch circuit 281 are connected. For example, in the first connection state, the at least one processor 240 may control the second switch circuit 282 so that the fifth port 282*b* and the sixth port 282*c* of the second switch circuit 282 are connected. For example, in the first connection state, the at least one processor 240 may control the third switch circuit 283 so that the seventh port 283*a* and the ninth port 283*c* of the third switch circuit 283 are connected. For example, in the first connection state, the first path P1 passing through the power branch circuit 270 may be formed through the first switch circuit 281 and the second switch circuit 282. For example, in the first connection state, the second path P2 passing through the power branch circuit 270 may be formed through the first switch circuit 281 and the third switch circuit 283.

According to an embodiment, in the first connection state, the first antenna 210 and the second antenna 220 may be configured to radiate circular polarization. As described above, the transmission signal transmitted from the RF transceiver may be provided to the first antenna 210 along the first path P1 and may be provided to the second antenna 220 along the second path P2. Since the phase shifter 260 is disposed on the second path P2, a phase of the transmission signal passing through the first path P1 and a phase of the transmission signal passing through the second path P2 may have a difference of 90 degrees. The first antenna 210 and the second antenna 220 may be configured to radiate circular polarization based on the phase difference.

For example, an antenna of the satellite 300 may have a circular polarization characteristic. According to Equation 1, a receive power may be determined based on a polarization loss coefficient according to a difference in polarization characteristics between a transmission antenna and a reception antenna. Since the first antenna 210 and the second antenna 220 may have a circular polarization characteristic in the first connection state, satellite communication efficiency of the first antenna 210 and the second antenna 220 may be improved. According to an exemplary embodiment, the electronic device 101 may improve the satellite communication efficiency by radiating the circular polarization using the first antenna 210 and the second antenna 220 orthogonal to each other, without separately having an antenna to be used for satellite communication.

Referring to FIG. 4C, in the second connection state, an electrical path bypassing the power branch circuit 270 may be formed. For example, in the second connection state, the third path P3 and the fourth path P4 may be formed. The instructions stored in the memory 130, when being executed by the at least one processor 240, may cause the electronic device 101 to control the at least one switch circuit 280 to provide the second connection state of the at least one switch circuit 280.

For example, the third path P3 may be an electrical path between the RF transceiver 250 and the first antenna 210 in the second connection state. For example, the third path P3 may be a path for electrically connecting the RF transceiver

250 and the first antenna 210 by bypassing the power branch circuit 270. For example, in the second connection state, a transmission signal provided from the RF transceiver 250 to the first antenna 210 may be provided along the third path P3. The transmission signal may be provided to the first antenna 210 by bypassing the power branch circuit 270.

For example, in the second connection state, the fourth path P4 may be an electrical path between the RF transceiver 250 and the second antenna 220. For example, the fourth path P4 may be an electrical path for electrically connecting the RF transceiver 250, the phase shifter 260, and the second antenna 220 by bypassing the power branch circuit 270. For example, in the second connection state, a transmission signal provided from the RF transceiver 250 to the second antenna 220 may be provided along the fourth path P4. The transmission signal may be provided to the second antenna 220 by bypassing the power branch circuit 270 and passing through the phase shifter 260.

For example, in the second connection state, the first antenna 210 and the second antenna 220 may be configured to radiate linear polarization. For example, the third path P3 may be independent from the fourth path P4. For example, in the second connection state, the first antenna 210 and the second antenna 220 may be used for communication diversity. For example, the electronic device 101 may transmit another signal to transmission diversity using the first antenna 210 and the second antenna 220. For example, the electronic device may receive a signal according to reception diversity using the first antenna 210 and the second antenna 220.

The first switch circuit 281, the second switch circuit 282, and the third switch circuit 283 illustrated in FIG. 4C indicate the second connection state. In the second connection state, the third path P3 for electrically connecting the RF transceiver 250 and the first antenna 210 and the fourth path P4 for electrically connecting the RF transceiver 250, the phase shifter 260, and the second antenna 220 may be formed through the at least one switch circuit 280.

For example, the at least one processor 240 may be configured to control the switch circuit to provide the second connection state, based on connecting the RF transceiver 250 and the second switch circuit 282 through the first switch circuit 281, connecting the first switch circuit 281 and the first antenna 210 through the second switch circuit 282, and connecting the second antenna 220 and the RF transceiver 250 through the third switch circuit 283.

For example, in the second connection state, the at least one processor 240 may control the first switch circuit 281 so that the first port 281*a* and the second port 281*b* of the first switch circuit 281 are connected. For example, in the first connection state, the at least one processor 240 may control the second switch circuit 282 so that the fourth port 282*a* and the sixth port 282*c* of the second switch circuit 282 are connected. For example, in the second connection state, the at least one processor 240 may control the third switch circuit 283 so that the eighth port 283*b* and the ninth port 283*c* of the third switch circuit 283 are connected. For example, in the second connection state, the third path P3 bypassing the power branch circuit 270 may be formed through the first switch circuit 281 and the second switch circuit 282. For example, in the second connection state, the fourth path P4 bypassing the power branch circuit 270 may be formed through the third switch circuit 283.

According to an embodiment, in the second connection state, the first antenna 210 and the second antenna 220 may be configured to radiate linear polarization. As described above, the third path P3 may be independent from the fourth path P4. The electronic device 101 may be configured to communicate with an external electronic device, by radiating a transmission signal through the first antenna 210 and the second antenna 220, based on a diversity technique (e.g., time diversity).

Figure 5A:
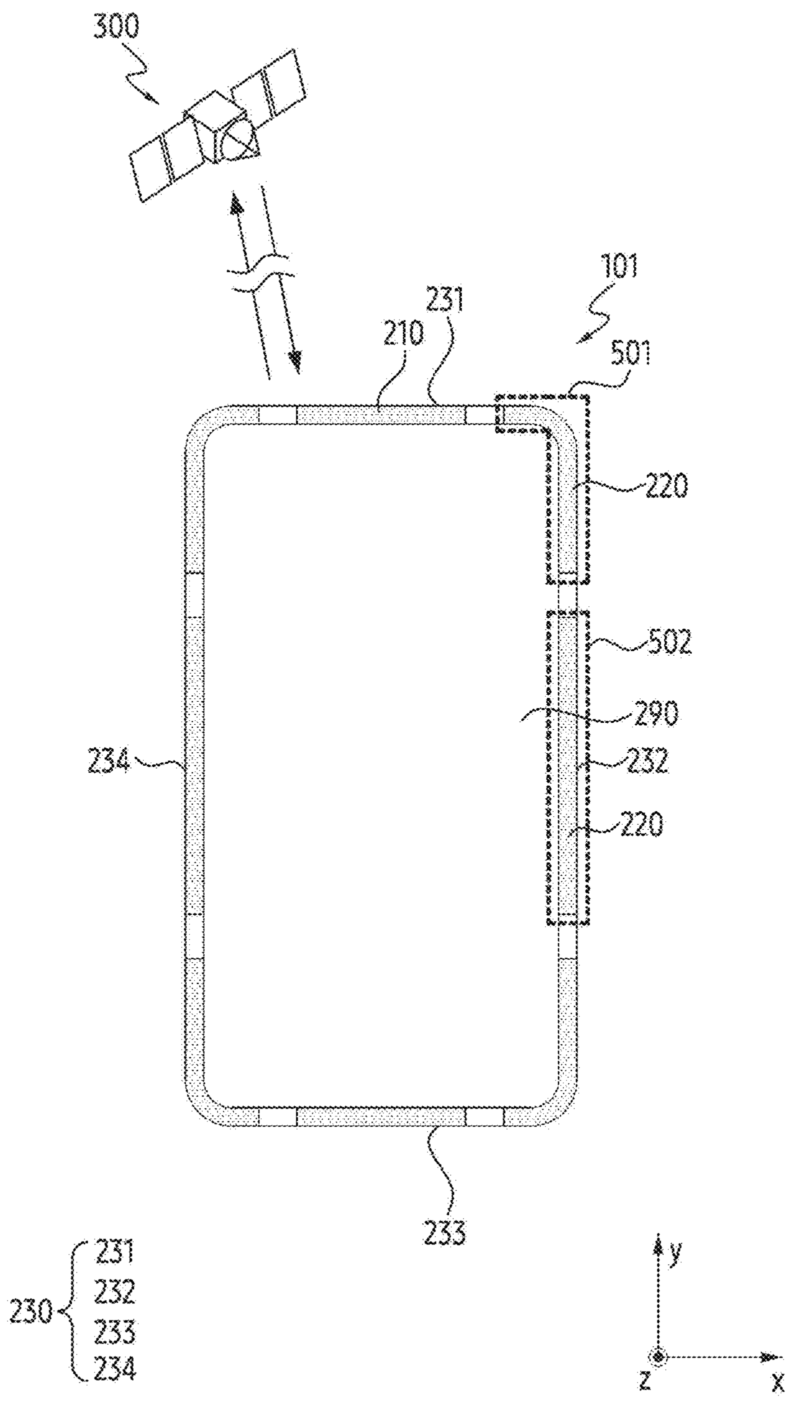
FIGS. 5A and 5B schematically illustrate locations of a first antenna and a second antenna of an electronic device according to an exemplary embodiment.
Figure 5B:
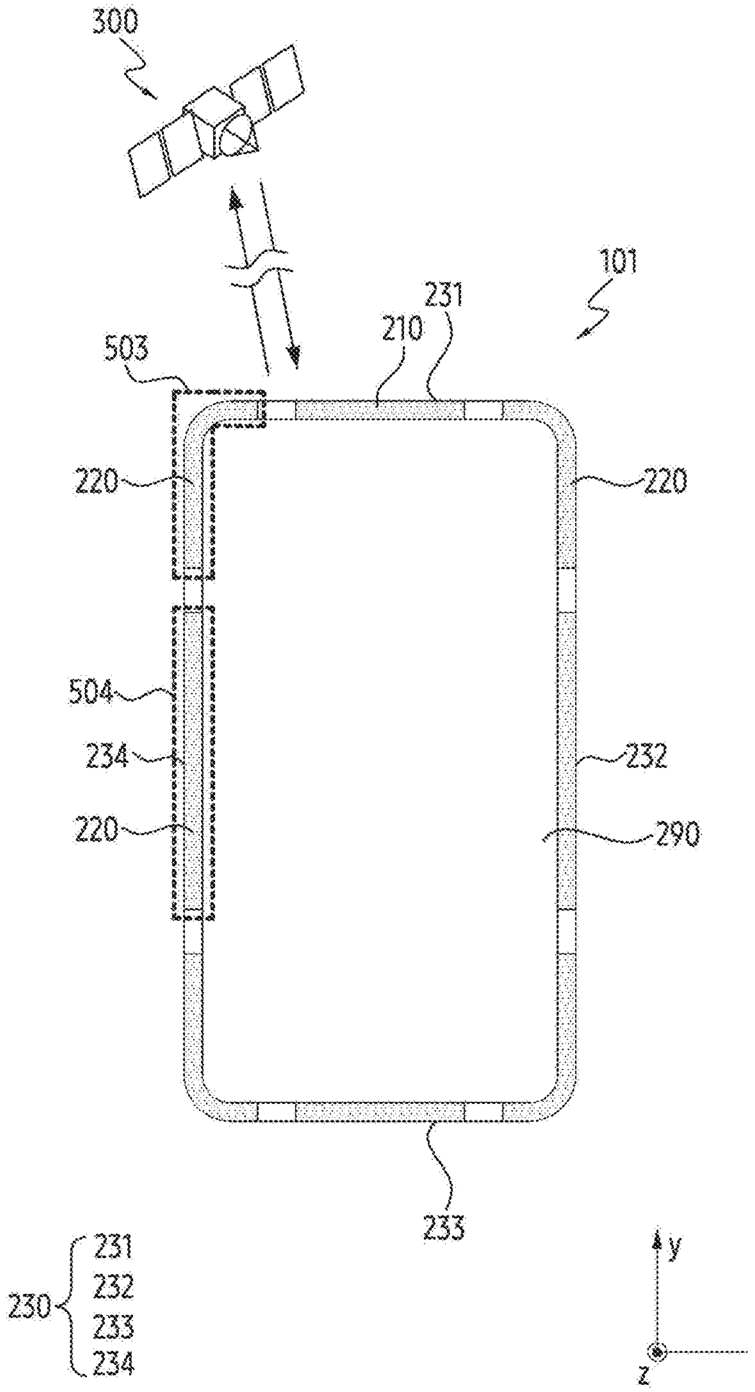
Figure 6:
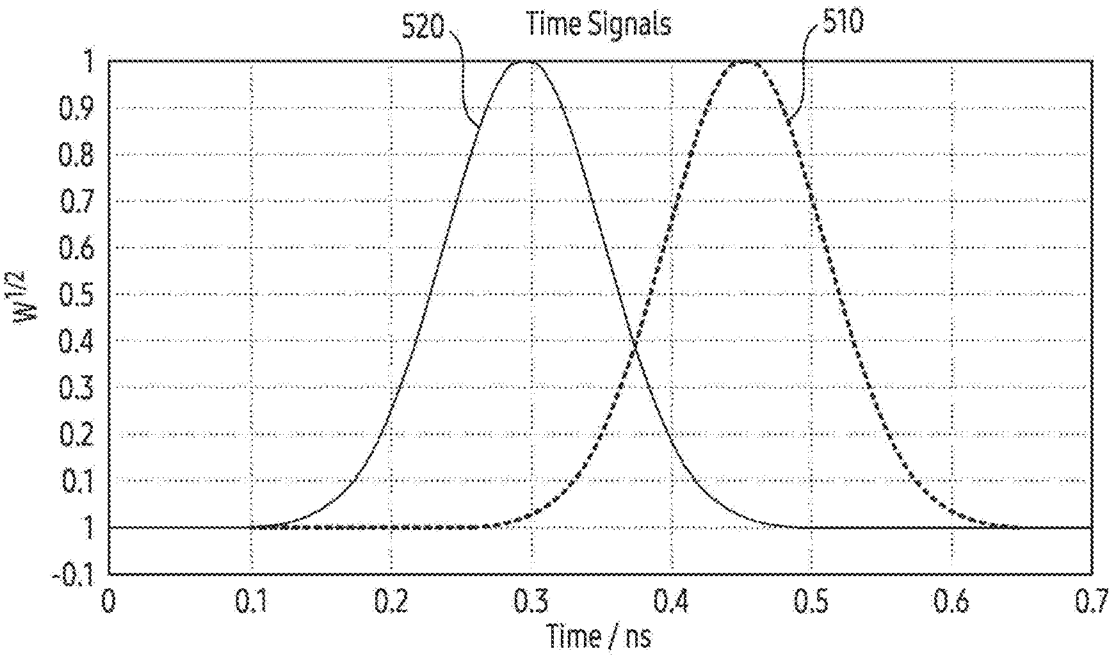
FIG. 6 is a graph illustrating a signal inputted to a first antenna and a second antenna with respect to a time domain.

FIGS. 5A and 5B schematically illustrate locations of a first antenna and a second antenna of an electronic device according to an exemplary embodiment. FIG. 6 is a graph illustrating a signal inputted to a first antenna and a second antenna with respect to a time domain.

For example, a polarization characteristic of the first antenna 210 and the second antenna 220 may be RHCP. The RHCP is circular polarization in which a trajectory of rotation in a circular plane perpendicular to a progress direction of a radio wave is counterclockwise.

Referring to FIG. 5A, the first antenna 210 and the second antenna 220 may be perpendicular to each other to radiate circular polarization. For example, the electronic device 101 may include at least one display 290. The at least one display 290 may define at least a part of a front surface of the electronic device 101. The first antenna 210 and the second antenna 220 are disposed on substantially the same plane (e.g., x-y plane) as the at least one display 290, and may be perpendicular to each other on the plane. In various embodiments of the disclosure, for convenience of description, an x-axis direction is defined as a horizontal direction, and a y-axis direction is defined as a vertical direction. In the following description, relative terms such as horizontal and vertical may be used to describe a relative location between the first antenna 210 and the second antenna 220. For example, when the electronic device 101 illustrated in the drawing is rotated by 90 degrees, horizontality and verticality may be exchanged with each other.

For example, the first antenna 210 and the second antenna 220 may transmit and/or receive a signal on a designated frequency band. For example, an electrical length of the first antenna 210 and an electrical length of the second antenna 220 may be a length corresponding to a frequency characteristic (e.g., resonance frequency) of a signal to be transmitted and/or received through the first and second antennas 210 and 220. For example, when a wavelength corresponding to a resonance frequency of the signal to be transmitted and/or received through the first antenna 210 and the second antenna 220 is λ, the electrical length of the first antenna 210 and the electrical length of the second antenna 220 may be about ¼λ to about ½λ. For example, when the resonance frequency of the signal is about 1.6 GHZ, the wavelength corresponding to the resonance frequency may be about 185 mm, and the electrical length of the first antenna 210 and the electrical length of the second antenna 220 may be about 46 mm to 93 mm.

As shown in FIG. 5A, the first antenna 210 may be disposed in a substantially horizontal direction (e.g., x-axis direction), and the second antenna 220 may be disposed in a substantially vertical direction (e.g., y-axis direction).

For example, when the first antenna 210 is at least partially formed along the first edge portion 231, the second antenna 220 may be at least partially formed along the second edge portion 232 perpendicular to the first edge portion 231. However, it is not limited thereto. For example, when the first antenna 210 is at least partially formed along the third edge portion 233, the second antenna 220 may be at least partially formed along the second edge portion 232 perpendicular to the third edge portion 233.

For example, a distance between the first antenna 210 and the second antenna 220 may be determined based on a frequency of a signal to be transmitted and/or received through the first antenna 210 and the second antenna 220. For example, when a wavelength corresponding to an operating frequency (e.g., about 1.6 GHZ) of the first antenna 210 and the second antenna 220 is λ, the distance between the first antenna 210 and the second antenna 220 may be less than or equal to about ½ λ. When synthesizing a radiation pattern of the first antenna 210 and a radiation pattern of the second antenna 220 to radiate circular polarization, in case that the distance between the first antenna 210 and the second antenna 220 is greater than about ½λ, a gain may be reduced according to occurrence of a grating lobe. In order to suppress the occurrence of the grating lobe, the distance between the first antenna 210 and the second antenna 220 may be less than or equal to about ½ of a wavelength corresponding to the operating frequency.

For example, the second antenna 220 may be disposed at a first location 501 including a corner of the frame 230, or may be disposed at a second location 502 spaced apart from the corner of the frame 230. For example, even when the second antenna 220 is located at the second location 502 relatively far from the first antenna 210, the distance between the first antenna 210 and the second antenna 220 may be less than or equal to about ½ of the wavelength corresponding to the operating frequency (e.g., about 1.6 GHZ) to suppress the occurrence of the grating lobe.

For example, in the first connection state, the same signal (e.g., −3 dB) may be inputted to each of the first antenna 210 and the second antenna 220 from the RF transceiver (e.g., the RF transceiver 250 of FIG. 3) in order that the first antenna 210 and the second antenna 220 radiate RHCP. As described above, a signal inputted to the second antenna 220 may have a phase difference with respect to a signal inputted to the first antenna 210 by passing through the phase shifter 260. When the electronic device 101 has an arrangement structure illustrated in FIG. 5A, the signal inputted to the second antenna 220 may have a phase difference of +90 degrees based on the signal inputted to the first antenna 210, in order to implement RHCP.

Referring to FIG. 6, a signal passing through a phase shifter (e.g., the phase shifter 260 of FIG. 3) may be delayed compared to a signal that does not pass through the phase shifter 260. For example, in the electronic device 101 having a structure illustrated in FIG. 5A, a first graph 510 may be a graph for a signal inputted to the first antenna 210, and a second graph 520 may be a graph for a signal inputted to the second antenna 220. In FIG. 6, x-axis is time (unit: nano second), and y-axis is watt $(W)^{1/2}$.

Since a phase of the signal inputted to the second antenna 220 may be delayed while passing through the phase shifter 260, it may have a phase difference of +90 degrees compared to the signal inputted to the first antenna 210. For example, since a signal inputted to the second antenna 220 included in the second edge portion 232 defining at least a part of an edge of one side (e.g., +x direction) has a phase difference of +90 degrees, compared to a signal inputted to the first antenna 210 included in the first edge portion 231 defining at least a part of an edge of upper (e.g., the +y direction), RHCP may be implemented.

Referring to FIG. 5B, when the first antenna 210 is at least partially formed along the first edge portion 231, the second antenna 220 may be at least partially formed along the fourth edge portion 234 perpendicular to the first edge portion 231. As illustrated in FIG. 5B, the first antenna 210 may be disposed in a substantially horizontal direction (e.g., x-axis direction), and the second antenna 220 may be disposed in a substantially vertical direction (e.g., y-axis direction). For example, the second antenna 220 may be disposed at a third location 503 including a corner of the frame 230, or may be disposed at a fourth location 504 spaced apart from the corner of the frame 230. For example, even when the second antenna 220 is located at the fourth location 504 relatively far from the first antenna 210, the distance between the first antenna 210 and the second antenna 220 may be less than or equal to about ½ of a wavelength corresponding to the operating frequency (e.g., about 1.6 GHZ) to suppress the occurrence of the grating lobe.

When the electronic device 101 has an arrangement structure illustrated in FIG. 5B, the signal inputted to the second antenna 220 may have a phase difference of +270 degrees (or −90 degrees) based on the signal inputted to the first antenna 210, in order to implement RHCP. Since a phase of the signal inputted to the second antenna 220 may be delayed while passing through the phase shifter 260, it may have a phase difference of +270 degrees compared to the signal inputted to the first antenna 210. For example, as the signal inputted to the second antenna 220 included in the fourth edge portion 234 defining at least a part of an edge of another side (e.g., −x direction) has a phase difference of +270 degrees, compared to the signal inputted to the first antenna 210 included in the first edge portion 231 defining at least a part of an edge of the upper (e.g., the +y direction), RHCP may be implemented.

Figure 7A:
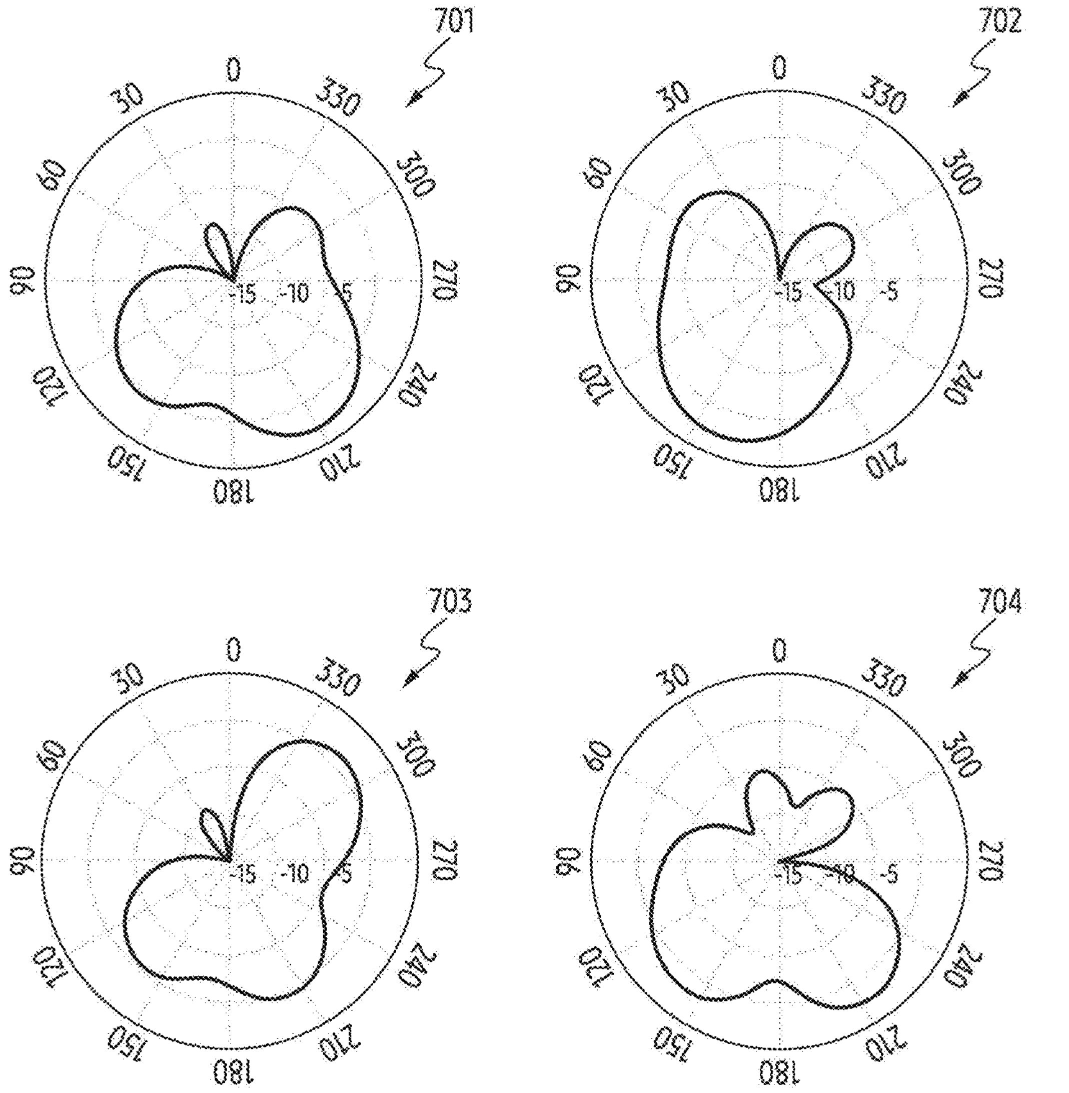
FIG. 7A illustrates a gain according to locations of a first antenna and a second antenna in a first connection state.
Figure 7B:
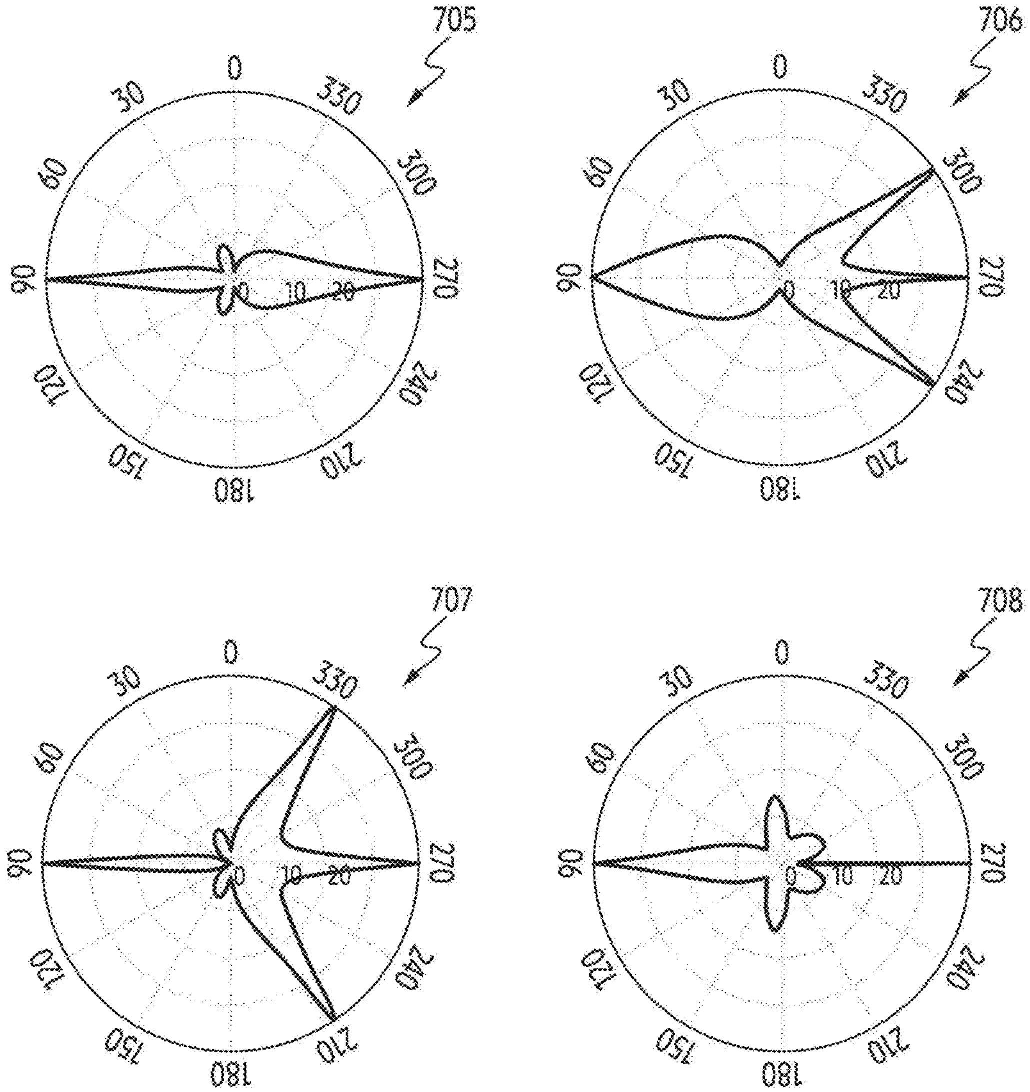
FIG. 7B illustrates an axial ratio according to locations of a first antenna and a second antenna in a first connection state.

FIG. 7A illustrates a gain according to locations of a first antenna and a second antenna in a first connection state. FIG. 7B illustrates an axial ratio according to locations of a first antenna and a second antenna in a first connection state.

For example, polar coordinate systems illustrated in FIG. 7A indicates a result of measuring a gain of a first antenna (e.g., the first antenna 210 of FIG. 2) and a second antenna (e.g., the second antenna 220 of FIG. 2) while rotating an azimuth angle for an electronic device (e.g., the electronic device 101 of FIG. 2) with a fixed posture. For example, a distance from a pole indicates the gain, and an angle with respect to a polar axis indicates the azimuth angle. For example, an angle of 0 degrees indicates a direction in which a rear surface (e.g., rear cover) of the electronic device 101 faces. For example, an angle of 90 degrees indicates a direction in which a bottom (e.g., the third edge portion of FIG. 2 (e.g., the third edge portion 233 of FIG. 2)) of the electronic device 101 faces. For example, an angle of 180 degrees indicates a direction in which a front surface (e.g., the at least one display 290 of FIG. 5A) of the electronic device 101 faces. For example, an angle of 270 degrees indicates a direction in which the upper (e.g., the first edge portion 231 of FIG. 2) of the electronic device 101 faces.

Radiation patterns illustrated in FIG. 7A indicate a gain pattern of circular polarization for a signal in a designated frequency band (e.g., about 1.6 GHZ) according to the azimuth angle with respect to the electronic devices 101 with a posture in which an angle of altitude is fixed.

701 of FIG. 7A shows a gain of circular polarization of the first antenna 210 and the second antenna 220 when the second antenna 220 is disposed at a first location (e.g., the first location 501 of FIG. 5A) in the electronic device 101 of the structure illustrated in FIG. 5A. 702 of FIG. 7A shows a gain of circular polarization of the first antenna 210 and the second antenna 220 when the second antenna 220 is disposed at a second location (e.g., the second location 502 of FIG. 5A) in the electronic device 101 of the structure illustrated in FIG. 5A. 703 of FIG. 7A shows a gain of circular polarization of the first antenna 210 and the second antenna 220 when the first antenna 210 is disposed at a third location (e.g., the third location 503 of FIG. 5B) in the electronic device 101 of the structure illustrated in FIG. 5B.

704 of FIG. 7A shows a gain of circular polarization of the first antenna 210 and the second antenna 220 when the first antenna 210 is disposed at a fourth location (e.g., the fourth location 504 of FIG. 5B) in the electronic device 101 of the structure illustrated in FIG. 5B.

Referring to FIG. 7A, a direction of main lobe of a radiation pattern and a gain of the radiation pattern may be different according to locations of the first antenna 210 and the second antenna 220, but the first antenna 210 and the second antenna 220 may radiate circular polarization substantially in the front (e.g., a direction toward which at least one display 290 faces) of the electronic device 101. Even when locations of the first antenna 210 and the second antenna 220 are changed, the gain of circular polarization may be sufficient to perform satellite communication.

The axial ratios illustrated in FIG. 7B indicate an axial ratio of circular polarization of the first antenna 210 and the second antenna 220 with respect to a signal on a designated frequency band (e.g., about 1.6 GHZ) according to the azimuth angle, with respect to the electronic device 101 with a posture in which an angle of altitude is fixed. The axial ratio may indicate a ratio of a horizontal radiation component with respect to a vertical radiation component, in the circular polarization radiated by the first antenna 210 and the second antenna 220. As the axial ratio is closer to 0 dB, a vertical radiation component size and a horizontal radiation component size are similar, and thus polarization close to circular may be indicated.

For example, polar coordinate systems illustrated in FIG. 7B indicate a result of measuring the axial ratio of circular polarization of the first antenna (e.g., the first antenna 210 of FIG. 2) and the second antenna (e.g., the second antenna 220 of FIG. 2) while rotating the azimuth angle for the electronic device (e.g., the electronic device 101 of FIG. 2) with a fixed posture. For example, a distance from a pole indicates the axial ratio, and an angle with respect to the polar axis indicates the azimuth angle. For example, an angle of 0 degrees indicates a direction in which a rear surface (e.g., rear cover) of the electronic device 101 faces. For example, an angle of 90 degrees indicates a direction in which the bottom (e.g., the third edge portion 233 of FIG. 2) of the electronic device 101 faces. For example, an angle of 180 degrees indicates a direction in which the front surface (e.g., the at least one display 290 of FIG. 5A) of the electronic device 101 faces. For example, an angle of 270 degrees indicates a direction in which the upper (e.g., the first edge portion 231 of FIG. 2) of the electronic device 101 faces.

705 of FIG. 7B illustrates the axial ratio of circular polarization of the first antenna 210 and the second antenna 220 when the second antenna 220 is disposed at the first location (e.g., the first location 501 of FIG. 5A) in the electronic device 101 of the structure illustrated in FIG. 5A. 706 of FIG. 7B illustrates the axial ratio of circular polarization of the first antenna 210 and the second antenna 220 when the second antenna 220 is disposed at the second location (e.g., the second location 502 of FIG. 5A) in the electronic device 101 of the structure illustrated in FIG. 5A. 707 of FIG. 7B illustrates the axial ratio of the circular polarization of the first antenna 210 and the second antenna 220 when the first antenna 210 is disposed at the third location (e.g., the third location 503 of FIG. 5A) in the electronic device 101 of the structure illustrated in FIG. 5B. 708 of FIG. 7B illustrates the axial ratio of circular polarization of the first antenna 210 and the second antenna 220 when the first antenna 210 is disposed at the fourth location (e.g., the fourth location 504 of FIG. 5A) in the electronic device 101 of the structure illustrated in FIG. 5B.

Referring to FIG. 7B, although the axial ratio of circular polarization may be different according to the location of the first antenna 210 and the second antenna 220, the axial ratio in a direction (e.g., a direction toward which the at least one display 290 faces) of the main lobe of the circular polarization all have the axial ratio less than or equal to 5 dB. For example, even when locations of the first antenna 210 and the second antenna 220 are changed, the electronic device 101 may implement circular polarization using the first antenna 210 and the second antenna 220 orthogonal to each other. According to an embodiment, satellite communication efficiency of the electronic device 101 implementing circular polarization may be improved.

Figure 8:
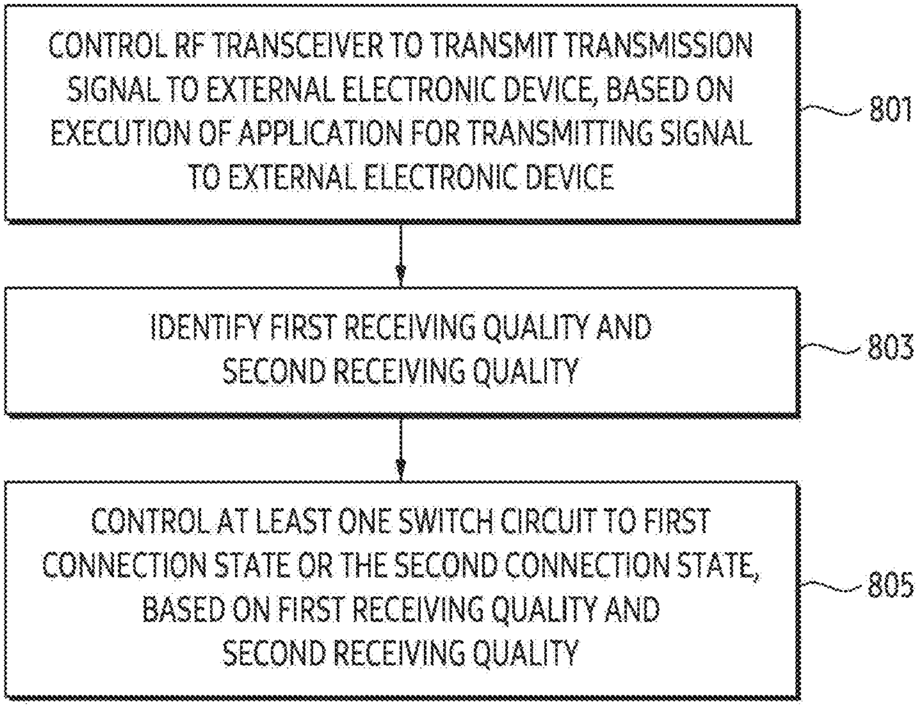
FIG. 8 is a flowchart illustrating an operation of at least one switch circuit while an electronic device performs satellite communication, according to an exemplary embodiment.

FIG. 8 is a flowchart illustrating an operation of at least one switch circuit while an electronic device performs satellite communication, according to an exemplary embodiment.

An operation illustrated in FIG. 8 may be an operation caused by the electronic device 101 when instructions stored in memory (e.g., the memory 130 of FIG. 3) are executed by at least one processor (e.g., the at least one processor 240 of FIG. 3).

Referring to FIG. 8, in operation 801, the at least one processor 240 may control an RF transceiver (e.g., the RF transceiver 250 of FIG. 3) to transmit a transmission signal to an external electronic device, based on execution of an application for transmitting a signal to the external electronic device (e.g., the satellite 300 of FIG. 2).

For example, an electronic device (e.g., the electronic device 101 of FIG. 2) may be configured to perform satellite communication. For example, the electronic device 101 may be configured to transmit and/or receive a signal in a satellite communication frequency band (e.g., about 1.6 GHZ) used in a non-terrestrial network using only a satellite network without a cellular network. For example, in an area where a cellular network is not provided, the electronic device 101 may perform satellite communication through a signal in the satellite communication frequency band.

For example, satellite communication may be performed based on execution of an application for transmitting a signal to an external electronic device (e.g., the satellite 300). For example, the electronic device 101 may include an application for transmitting an SOS signal (e.g., SOS message) requesting emergency rescue using the satellite 300, in the area where a cellular network is not provided. For example, the SOS signal may include location information (e.g., longitude, latitude) of the electronic device 101 and/or medical information related to a user. Based on execution of the application, the at least one processor 240 may control the RF transceiver 250 to transmit a transmission signal to the satellite 300. The RF transceiver 250 may transmit a signal in the satellite communication frequency band through a first antenna (e.g., the first antenna 210 of FIG. 2) and a second antenna (e.g., the second antenna 220 of FIG. 2).

In operation 803, the at least one processor 240 may identify a first receiving quality and a second receiving quality.

For example, the at least one processor 240 may control the at least one switch circuit 280 so that at least one switch circuit (e.g., the at least one switch circuit 280 of FIG. 3) provides a first connection state or a second connection state. For example, the first receiving quality may be referred to as a receiving quality of a first signal received through the first antenna 210 and the second antenna 220 in the first connection state. For example, the second receiving quality may be referred to as a receiving quality of a second signal received through the first antenna 210 and the second antenna 220 in the second connection state.

For example, a signal quality in various embodiments of the disclosure may be at least one of reference signal received power (RSRP), beam reference signal received power (BRSRP), reference signal received quality (RSRQ), received signal strength indicator (RSSI), signal to interference and noise ratio (SINR), carrier to interference and noise ratio (CINR), signal to noise ratio (SNR), error vector magnitude (EVM), bit error rate (BER), and block error rate (BLER). In addition to the examples described above, other terms with equivalent technical meaning or other metrics indicating channel quality may obviously be used. Hereinafter, in the disclosure, the high signal quality means that a signal quality value related to a signal size is large or a signal quality value related to error rate is small. A higher signal quality may mean that a smooth wireless communication environment is guaranteed. In addition, an optimal beam may mean a beam having a highest signal quality among beams. For example, the receiving quality may be identified based on a received signal strength indicator (RSSI) value indicating a strength of a reception signal of radio wave. For example, the first receiving quality may include an RSSI value of the first signal, and the second receiving quality may include an RSSI value of the second signal. However, it is not limited thereto.

For example, in operation 803, the at least one processor 240 may control the at least one switch circuit 280 to the first connection state and identify the RSSI value of the first signal. For example, the at least one processor 240 may change the at least one switch circuit 280 from the first connection state to the second connection state and identify the RSSI value of the second signal.

For example, in operation 805, the at least one processor 240 may control the at least one switch circuit 280 to the first connection state or the second connection state, based on the first receiving quality and the second receiving quality.

For example, when communicating with an external electronic device (e.g., the satellite 300), the at least one processor 240 may communicate with the external electronic device based on a state of high receiving quality among the first connection state and the second connection state. For example, the at least one processor 240 may compare the first receiving quality with the second receiving quality. For example, when the first receiving quality is higher than the second receiving quality, the at least one processor 240 may control the at least one switch circuit 280 to the first connection state. For example, when the second receiving quality is higher than the first receiving quality, the at least one processor 240 may control the at least one switch circuit 280 to the second connection state.

For example, the at least one processor 240 may compare the RSSI value of the first signal with the RSSI value of the second signal. For example, when the RSSI value of the first signal is greater than the RSSI value of the second signal, the at least one processor 240 may control the at least one switch circuit 280 to the first connection state. For example, when the RSSI value of the second signal is greater than the RSSI value of the first signal, the at least one processor 240 may control the at least one switch circuit 280 to the second connection state. When the electronic device 101 communicates with an external electronic device, the electronic device 101 may communicate with the external electronic device in the higher communication quality, thereby improving communication efficiency. For example, when the electronic device 101 performs satellite communication, the electronic device 101 may identify a higher connection state among the first connection state and the second connection state, and perform satellite communication based on the identified connection state.

Figure 9A:
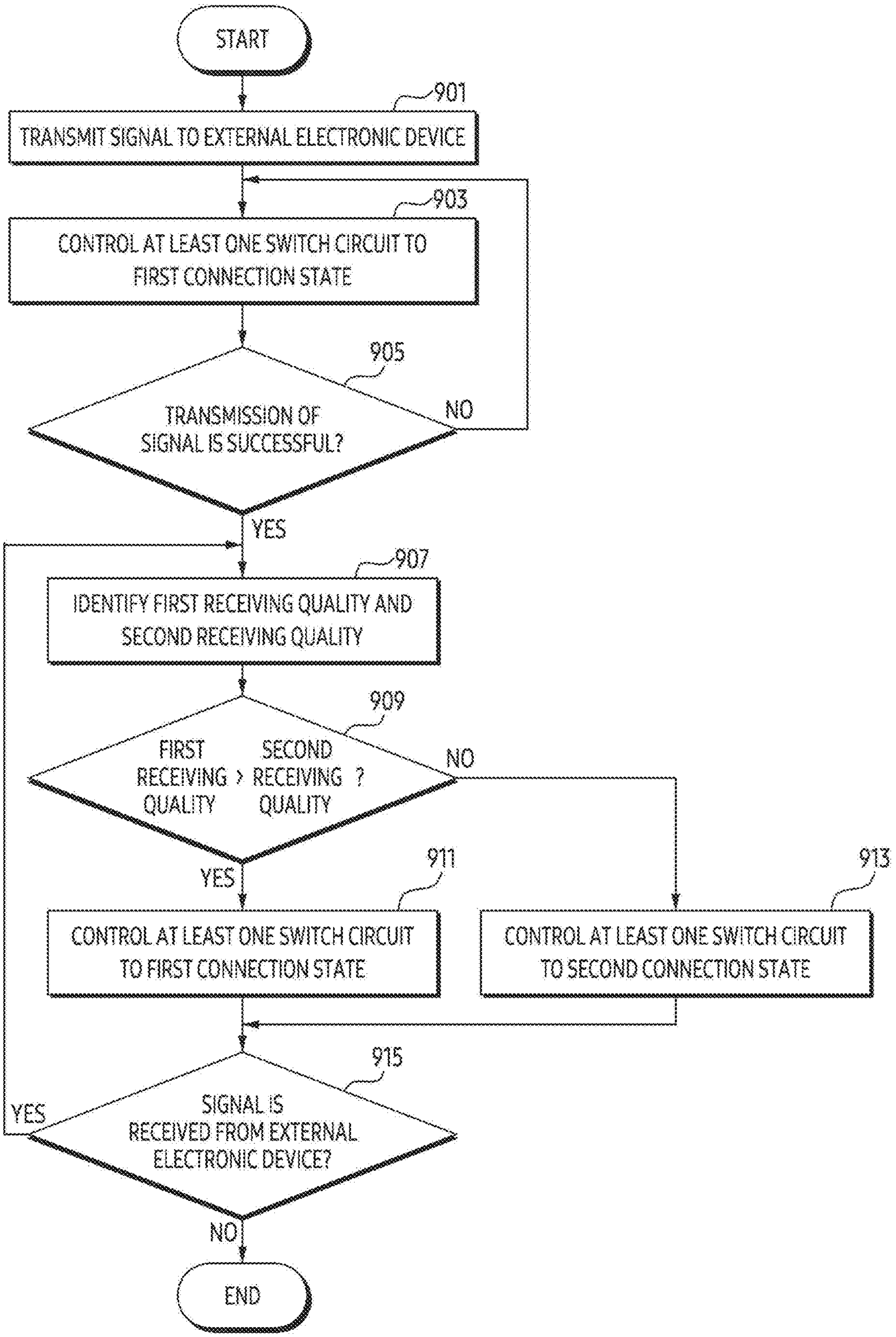
FIG. 9A is a flowchart of an operation in which an electronic device communicates with an external electronic device, according to an exemplary embodiment.
Figure 9B:
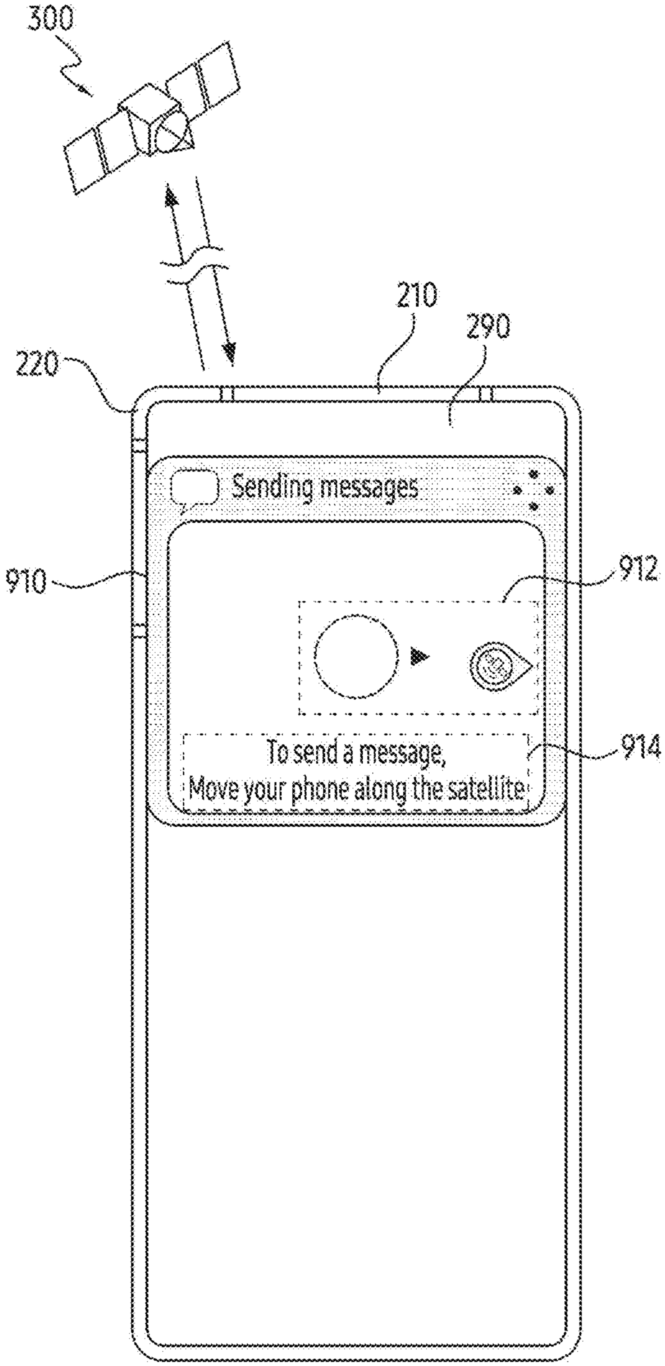
FIGS. 9B and 9C illustrate a visual object displayed through a display of an electronic device according to an exemplary embodiment.
Figure 9C:
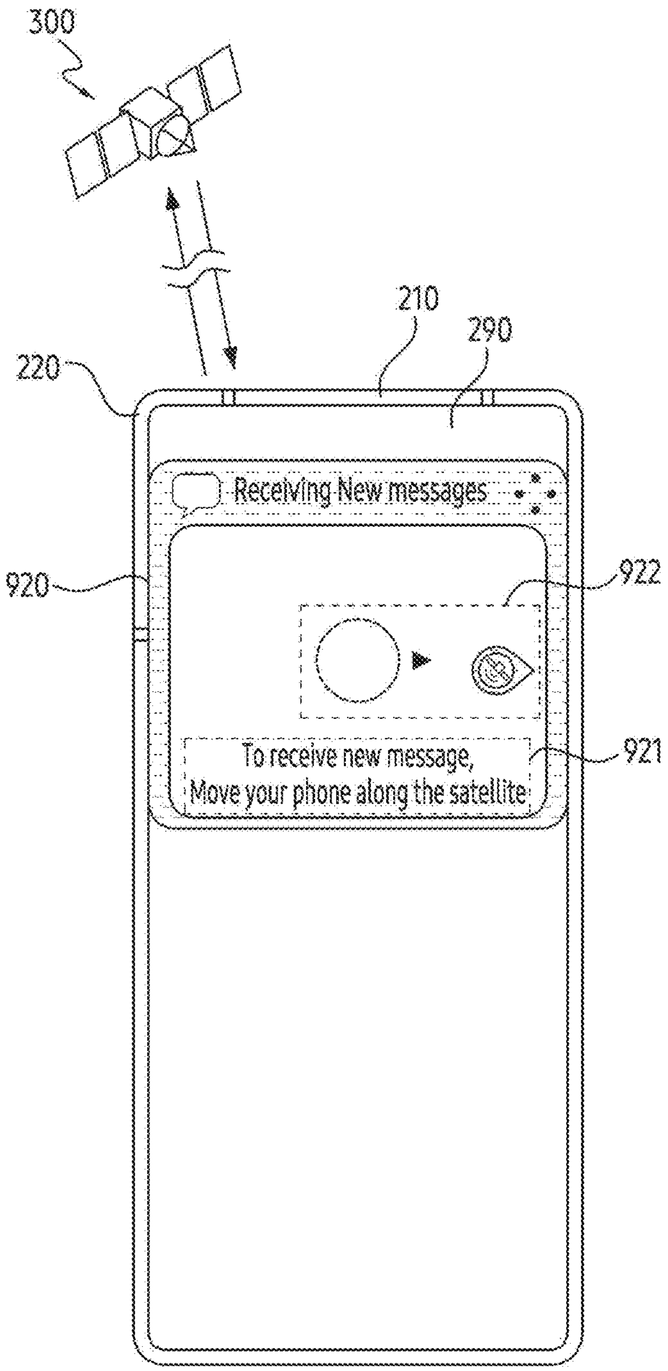

FIG. 9A is a flowchart of an operation in which an electronic device communicates with an external electronic device, according to an exemplary embodiment. FIGS. 9B and 9C illustrate a visual object displayed through a display of an electronic device according to an exemplary embodiment.

For example, an operation illustrated in FIG. 9A may be referred to as an operation of the electronic device 101 performing an emergency rescue request within an area where a cellular network is not provided. The operation illustrated in FIG. 9A may be an operation caused by the electronic device 101 when instructions stored in memory (e.g., the memory 130 of FIG. 3) being executed by at least one processor (e.g., the at least one processor 240 of FIG. 3).

Referring to FIG. 9A, in operation 901, the at least one processor 240 may transmit a signal to an external electronic device.

For example, the external electronic device may be a satellite (e.g., the satellite 300 of FIG. 2). For example, the at least one processor 240 may control an RF transceiver (e.g., the RF transceiver 250 of FIG. 3) to transmit a transmission signal to an external electronic device, based on execution of an application for transmitting a signal to the external electronic device (e.g., the satellite 300). For example, the application may include an application for transmitting an SOS signal (e.g., SOS message) requesting emergency rescue using satellite communication. Operation 901 may be referred to as operation 801 of FIG. 8.

In operation 903, the at least one processor 240 may control at least one switch circuit (e.g., the at least one switch circuit 280 of FIG. 3) to the first connection state.

For example, the at least one processor 240 may control the at least one switch circuit 280 to the first connection state, based on transmitting a signal to the satellite 300. For example, the at least one processor 240 may identify a signal transmission to an external electronic device, based on identifying the execution of the application. For example, the at least one processor 240 may identify performing of satellite communication, based on identifying the execution of the application.

While transmitting the signal to the satellite 300, the at least one processor 240 may increase satellite communication efficiency by controlling the at least one switch circuit 280 to the first connection state. As described above, in the first connection state, the first antenna 210 and the second antenna 220 may be configured to radiate circular polarization. For example, the circular polarization may be RHCP. As the first antenna 210 and the second antenna 220 radiate circular polarization in the first connection state, a polarization characteristic of the first antenna 210 and the second antenna 220 may correspond to a polarization characteristic of an antenna of the satellite 300. While performing satellite communication, the polarization characteristic of the first antenna 210 and the second antenna 220 may correspond to the polarization characteristic of the antenna of the satellite 300, so that the communication efficiency may be improved.

For example, the at least one processor 240 may identify a location of the satellite 300. For example, the electronic device 101 may include memory storing information on an orbit of the satellite 300. The at least one processor 240 may identify a location of the satellite 300 at a timing when satellite communication is performed, based on the information on the orbit of the satellite 300 stored in the memory. The at least one processor 240 may display a visual object guiding a posture of the electronic device 101 in which the first antenna 210 and the second antenna 220 face the satellite 300 through at least one display (e.g., the at least one display 290 of FIG. 9B), based on the identified location of the satellite 300. For example, the posture may be referred to as a posture of the electronic device 101 locating the first antenna 210 and the second antenna 220 so that electromagnetic waves formed by the first antenna 210 and the second antenna 220 face the satellite 300.

Referring to FIG. 9B, the electronic device 101 may include at least one display 290. For example, the electronic device 101 may include the at least one display 290 defining at least a part of the front surface of the electronic device 101.

For example, the at least one processor 240 may identify a location of the satellite 300, based on the execution of the application for transmitting the SOS message to the satellite 300. The at least one processor 240 may display a first visual object 910 for guiding a posture of the electronic device 101 in which the first antenna 210 and the second antenna 220 face the satellite 300 through the at least one display 290. For example, the first visual object 910 may include text 914 such as 'To send a message, move your phone along the satellite' and/or 'To send a new message, move your phone along the satellite 300'. For example, the first visual object 910 may include an image representing the satellite 300 and an image 912 indicating a direction in which the satellite 300 faces. However, it is not limited thereto. The user may change a posture of the electronic device 101 through the first visual object 910, so that the first antenna 210 and the second antenna 220 face the satellite 300. When the first antenna 210 and the second antenna 220 transmit a signal to the satellite 300 in a posture facing the satellite 300, satellite communication efficiency is improved, and thus a transmission success rate of the SOS message may be increased. The above-described first visual object 910 may be displayed through the at least one display 290 while operations 901, 903, and/or 905 illustrated in FIG. 9A are performed.

Referring back to FIG. 9A, in operation 905, the at least one processor 240 may identify whether transmission of a signal (e.g., SOS message) to an external electronic device has been successful. For example, in operation 905, when a transmission failure of the signal is identified, operation 901 may be performed again. For example, in operation 905, when a transmission success of the signal is identified, operation 907 may be performed.

In operation 907, the at least one processor 240 may identify the first receiving quality and the second receiving quality.

For example, the at least one processor 240 may identify a first receiving quality of a first signal received through the first antenna 210 and the second antenna 220 in the first connection state, based on identifying the transmission of the signal. For example, in operation 903, since the at least one switch circuit 280 is controlled to the first connection state, the at least one processor 240 may identify the first receiving quality by maintaining the first connection state. For example, the first receiving quality may be referred to as a first RSSI value of the first signal.

For example, the at least one processor 240 may control at least one switch to the second connection state, and identify the second receiving quality of the second signal received through the first antenna 210 and the second antenna 220 in the second connection state. For example, the at least one processor 240 may change the at least one switch circuit 280 from the first connection state to the second connection state, and identify the second receiving quality in the second connection state. For example, the second receiving quality may be referred to as a second RSSI value of the second signal.

In operation 909, the at least one processor 240 may compare the first receiving quality and the second receiving quality. For example, the at least one processor 240 may identify whether the first receiving quality is higher than the second receiving quality.

For example, a response signal of the satellite 300 with respect to the signal transmitted to the satellite 300 (e.g., SOS message) may be received. For example, the signal transmitted to the satellite 300 may include location information (e.g., latitude, longitude) of the electronic device 101 and/or medical information related to the user. The satellite 300 may receive a signal including the information, and transmit a response signal with respect to the signal and a ring alert signal to the electronic device 101 to notify reception information (e.g., reception timing) with respect to the response signal. In order to receive the response signal transmitted from the satellite 300, the at least one processor 240 may be configured to identify a connection state having a higher quality among the first connection state and the second connection state.

For example, the at least one processor 240 may identify a connection state indicating a higher receiving quality by comparing the first receiving quality with the second receiving quality. For example, in case that the first RSSI value is greater than the second RSSI value, since strength of a reception signal in the first connection state is higher than that of a reception signal in the second connection state, the first connection state may be referred to as a connection state indicating a higher receiving quality than the second connection state. For example, in case that the second RSSI value is greater than the first RSSI value, since the strength of the reception signal in the second connection state is higher than the strength of the reception signal in the first connection state, the second connection state may be referred to as a connection state indicating a higher receiving quality than the first connection state.

For example, in operation 909, when it is identified that the first receiving quality is higher than the second receiving quality, operation 911 may be performed. For example, in operation 909, when it is identified that the second receiving quality is higher than the first receiving quality, operation 913 may be performed.

In operation 911, the at least one processor 240 may control the at least one switch circuit 280 to the first connection state.

For example, when the first receiving quality is higher than the second receiving quality, satellite communication efficiency in the first connection state may be higher than satellite communication efficiency in the second connection state. The at least one processor 240 may control the at least one switch circuit 280 to the first connection state in order to receive a response signal from the satellite 300. As the at least one switch circuit 280 provides the first connection state, a success rate of receiving a response signal and/or a ring alert signal from the satellite 300 may be improved.

In operation 913, the at least one processor 240 may control the at least one switch circuit 280 to the second connection state.

For example, when the second receiving quality is higher than the first receiving quality, the satellite communication efficiency in the second connection state may be higher than satellite communication efficiency in the first connection state. The at least one processor 240 may control the at least one switch circuit 280 to the second connection state in order to receive a response signal from the satellite 300. As the at least one switch circuit 280 provides the second connection state, the success rate of receiving the response signal and/or the ring alert signal from the satellite 300 may be improved. For example, the electronic device 101 may transmit another signal to transmission diversity using the first antenna 210 and the second antenna 220, in the second connection state. For example, the electronic device may receive a signal according to reception diversity using the first antenna 210 and the second antenna 220, in the second connection state.

In operation 915, the at least one processor 240 may identify whether a signal has been received from an external electronic device.

For example, in operation 915, based on identifying the reception of the signal from the external electronic device, an operation of performing the emergency rescue request may be terminated.

For example, the at least one processor 240 may identify reception of a response signal and/or a ring alert signal from the satellite 300 through the first antenna 210 and the second antenna 220. For example, when the reception of signal from the satellite 300 is not identified, operation 907 may be performed again. The at least one processor 240 may be configured to identify a connection state with a higher receiving quality provided through the at least one switch circuit 280 when the reception of signal from the satellite 300 is not identified, and control the at least one switch circuit 280 to the identified state.

Referring to FIG. 9C, the electronic device 101 may identify a location of the satellite 300 to receive a response signal and/or a ring alert signal from the satellite 300. The at least one processor 240 may display a second visual object 920 for guiding a posture of the electronic device 101 in which the first antenna 210 and the second antenna 220 face the satellite 300 through the at least one display 290, based on the location of the identified satellite 300.

For example, the second visual object 920 may include text 921 such as 'To receive new message, move your phone along the satellite' and/or 'To receive a new message, move your phone along the satellite 300'. For example, the second visual object 920 may include an image representing the satellite 300 and an image 922 indicating a direction in which the satellite 300 faces. However, it is not limited thereto. The user may change the posture of the electronic device 101 through the second visual object 920, so that the first antenna 210 and the second antenna 220 face the satellite 300. When the first antenna 210 and the second antenna 220 receive a signal from the satellite 300 in a posture facing the satellite 300, satellite communication efficiency may be improved, and thus the reception success rate of the response signal and/or the ring alert signal may be increased. The above-described second visual object 920 may be displayed through the at least one display 290 while operations 907, 909, 911, 913, and/or 915 illustrated in FIG. 9A are performed.

According to an exemplary embodiment, the electronic device 101 may improve communication efficiency by controlling a connection state of the at least one switch circuit 280 when performing satellite communication. For example, the electronic device 101 may transmit a signal to the satellite 300 using the first antenna 210 and the second antenna 220 radiating circular polarization in the first connection state. After the transmission of the signal is successful, the electronic device 101 may identify a state with higher reception efficiency, among the first connection state and the second connection state, while receiving the signal from the satellite 300 and control the at least one switch to the identified state. Due to various variables such as a location of the electronic device 101, a state of the electronic device 101, a surrounding environment, weather, and a location of the satellite 300, reception efficiency of the first connection state may be higher than reception efficiency of the second connection state, or conversely, the reception efficiency of the second connection state may be higher than the reception efficiency of the first connection state. According to an exemplary embodiment, the electronic device 101 may improve satellite communication efficiency by receiving a signal using the first antenna 210 and the second antenna 220 in a state with high reception efficiency.

A structure of the electronic device 101 described above may be various. For example, as illustrated in FIG. 2, the electronic device 101 may be of a bar type. However, it is not limited thereto. For example, the electronic device 101 may be a foldable type including a structure including a first housing part (e.g., the first housing part 1010 of FIG. 10A) and a second housing part (e.g., the second housing part 1020 of FIG. 10A), which are rotatably coupled. For example, even when the electronic device 101 is the foldable type, the electronic device 101 may implement circular polarization using the first antenna 210 and the second antenna 220 orthogonal to each other. For example, the electronic device 101 may implement circular polarization using the first antenna 210 and the second antenna 220 having a linear polarization characteristic, through the at least one switch circuit 280 capable of providing the first connection state or the second connection state.

Hereinafter, the electronic device 101 in the foldable type will be described. Excluding a foldable structure, the descriptions described above with reference to FIGS. 2, 3, 4A to 4C, 5A, 5B, 6, 7A, 7B, 8, and 9A to 9C may be substantially equally applied to the electronic device 101 to be described later. Components corresponding to the above-described components are given the same reference numerals, and overlapping descriptions may be omitted.

Figure 10A:
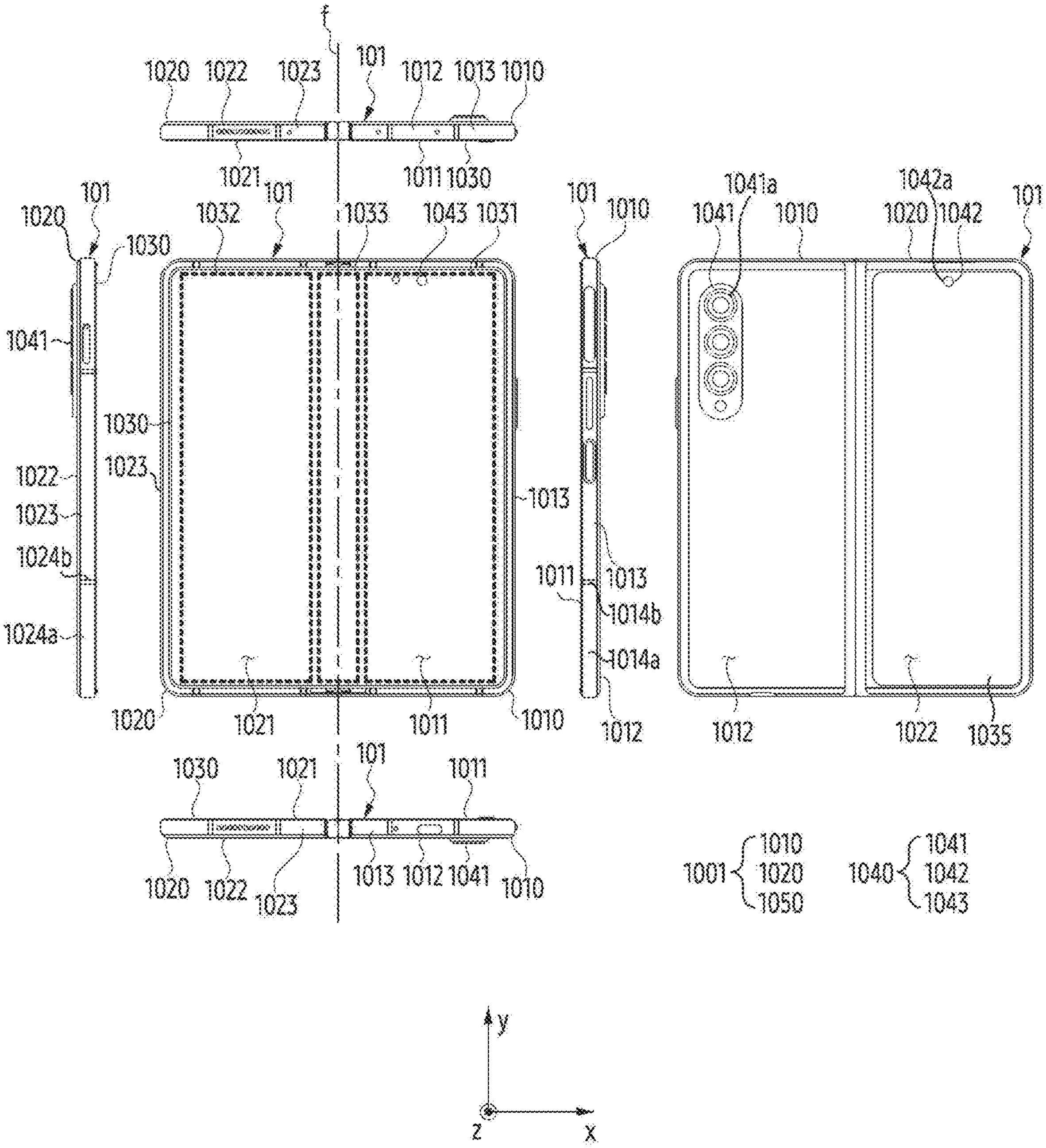
FIG. 10A illustrates an example of an unfolding state of an electronic device according to an exemplary embodiment.
Figure 10B:
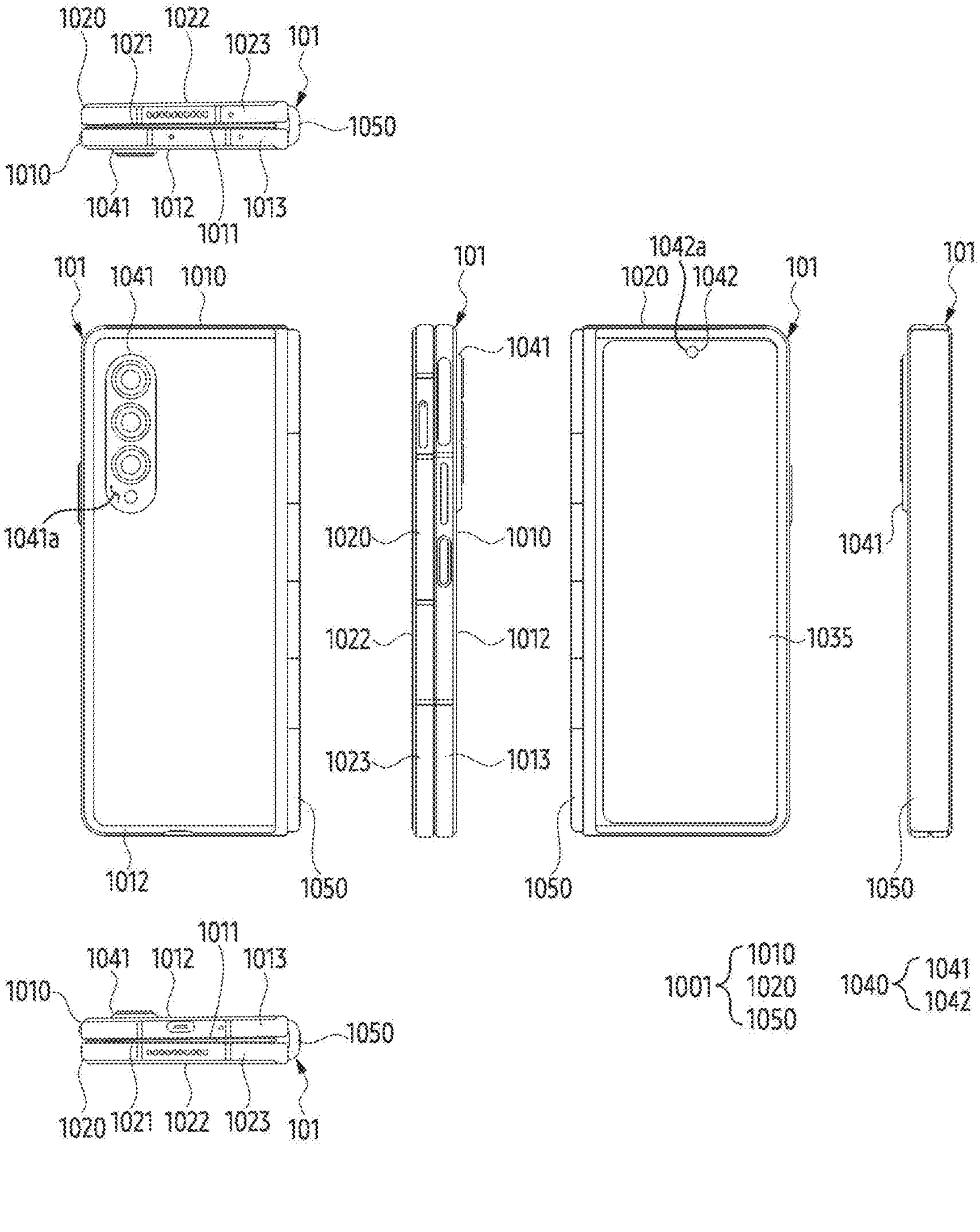
FIG. 10B illustrates an example of a folding state of an electronic device according to an exemplary embodiment.
Figure 10C:
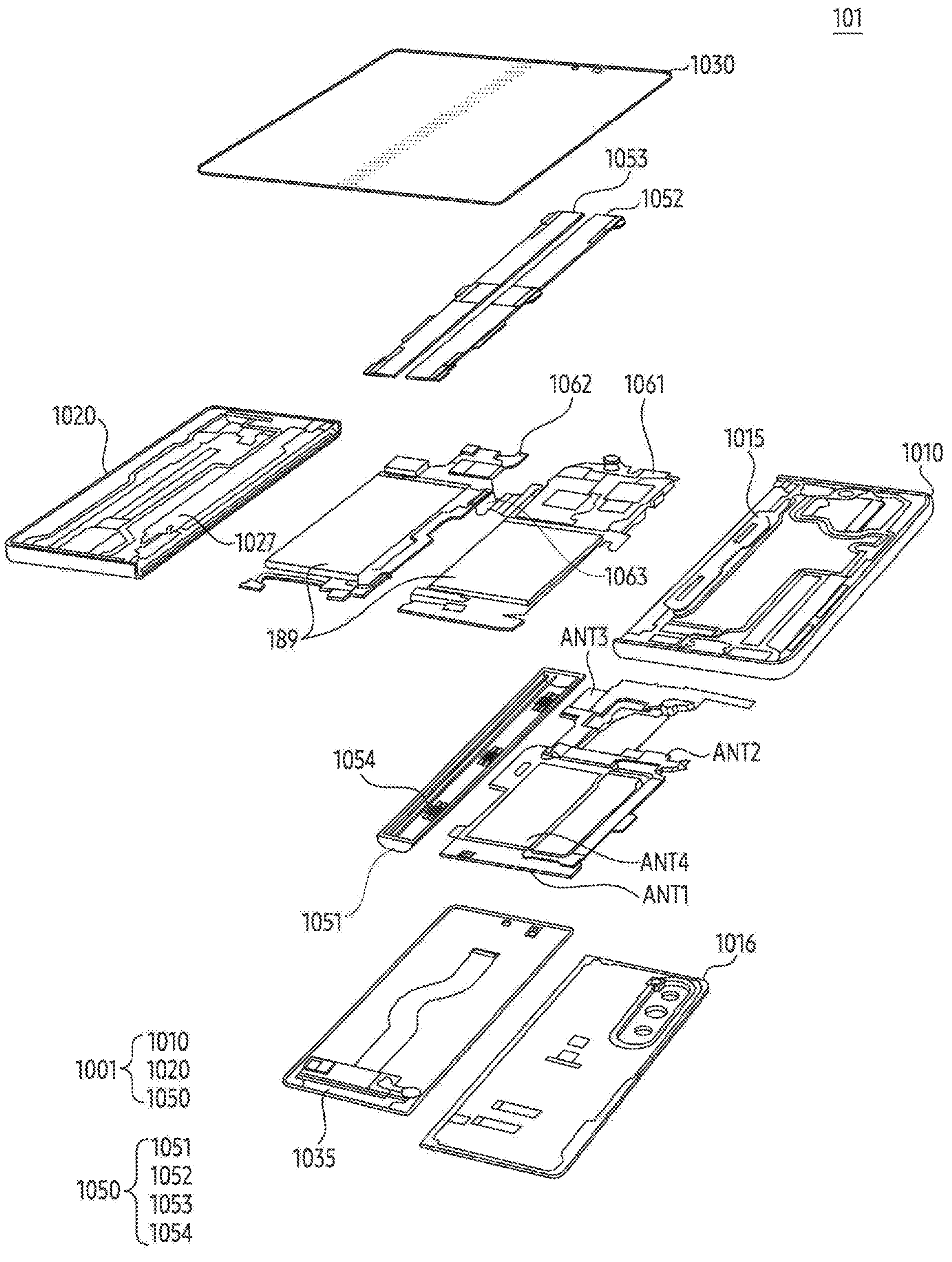
FIG. 10C is an exploded view of an electronic device according to an exemplary embodiment.

FIG. 10A illustrates an example of an unfolding state of an electronic device according to an exemplary embodiment. FIG. 10B illustrates an example of a folding state of an electronic device according to an exemplary embodiment. FIG. 10C is an exploded view of an electronic device according to an exemplary embodiment.

Referring to FIGS. 10A, 10B, and 10C, an electronic device (e.g., the electronic device 101 of FIG. 1) may include a housing 1001, a flexible display 1030 (e.g., the display module 160 of FIG. 1), and at least one camera 1040.

For example, the housing 1001 may define the exterior of the electronic device 101. For example, the housing 1001 is a physical exterior of the electronic device 101 exposed to the outside, and may surround components, which are disposed inside the electronic device 101 and not exposed to the outside. For example, the housing 1001 may include a first housing part 1010, a second housing part 1020, and a hinge structure 1050.

For example, the first housing part 1010 may include a first surface 1011, a second surface 1012 opposite to the first surface 1011, and a first side surface 1013 surrounding at least a part of the first surface 1011 and the second surface 1012. For example, the first surface 1011 may be referred to as a front surface of the first housing part 1010, and the second surface 1012 may be referred to as a rear surface of the first housing part 1010. The first side surface 1013 may be connected to a periphery of the first surface 1011 and a periphery of the second surface 1012. The first surface 1011, the second surface 1012, and the first side surface 1013 may form an inner space of the first housing part 1010. For example, at least one component may be disposed in a space surrounded by the first surface 1011, the second surface 1012, and the first side surface 1013.

For example, the second housing part 1020 may include a third surface 1021, a fourth surface 1022 opposite to the third surface 1021, and a second side surface 1023 surrounding at least a part of the third surface 1021 and the fourth surface 1022. For example, the third surface 1021 may be referred to as a front surface of the second housing part 1020, and the fourth surface 1022 may be referred to as a rear surface of the second housing part 1020. The second side surface 1023 may be connected to a periphery of the third surface 1021 and a periphery of the fourth surface 1022. The third surface 1021, the fourth surface 1022, and the second side surface 1023 may form an inner space of the second housing part 1020. For example, at least one component may be disposed in a space surrounded by the third surface 1021, the fourth surface 1022, and the second side surface 1023.

For example, the flexible display 1030 may be configured to display visual information. For example, the flexible display 1030 may include a display area including a plurality of pixels. For example, an active area may be referred to as an active area displaying visual information. For example, the flexible display 1030 may define at least a part of the front surface of housing 1001. For example, the flexible display 1030 may define at least a part of the first surface 1011 and the third surface 1021.

For example, the flexible display 1030 may include a first display area 1031 defining at least a part of the first surface 1011 of the first housing, a second display area 1032 defining at least a part of the third surface 1021 of the second housing, and a third display area 1033 disposed between the first display area 1031 and the second display area 1032. For example, the first display area 1031, the second display area 1032, and the third display area 1033 may define at least a part of the front surface of the housing 1001. For example, the electronic device 101 may further include a sub-display 1035 distinct from the flexible display 1030. The sub-display 1035 may be disposed on the fourth surface 1022 of the second housing part 1020. The sub-display 1035 may be referred to as a cover display.

For example, the at least one camera 1040 may be configured to obtain an image based on receiving light from an external subject of the electronic device 101. For example, the at least one camera 1040 may include first cameras 1041, a second camera 1042, or a third camera 1043. For example, the first cameras 1041 may be disposed in the first housing part 1010. For example, the first housing part 1010 may include at least one opening 1041*a* overlapping the first cameras 1041 when the electronic device 101 is viewed from above. The first cameras 1041 may obtain an image based on receiving light from the outside of the electronic device 101 through the at least one opening 1041*a*.

For example, the second camera 1042 may be disposed in the second housing part 1020. The second housing part 1020 may include at least one opening 1042*a* overlapping the second camera 1042 when the electronic device 101 is viewed from above. The second camera 1042 may obtain an image based on receiving light from the outside of the electronic device 101 through the at least one opening 1042*a*.

For example, the third camera 1043 may be disposed in the first housing part 1010. For example, the first display area 1031 of the flexible display 1030 may include at least one opening overlapping the third camera 1043 when the flexible display 1030 is viewed from above. The third camera 1043 may obtain an image based on receiving light from the outside of the flexible display 1030 through the at least one opening.

For example, the second camera 1042 and the third camera 1043 may be disposed under the flexible display 1030 (e.g., in the −z direction). For example, the second camera 1042 and/or the third camera 1043 may include an under display camera (UDC) and/or a punch hall camera.

For example, the first housing part 1010 and the second housing part 1020 may be rotatably coupled. For example, the second housing part 1020 may be coupled to the first housing part 1010 to be rotatable with respect to the first housing part 1010 through the hinge structure 1050.

For example, the hinge structure 1050 may rotatably connect the first housing part 1010 and the second housing part 1020. The hinge structure 1050 may be disposed between the first housing part 1010 and the second housing part 1020 of the electronic device 101 so that the electronic device 101 may be foldable. The hinge structure 1050 may enable the electronic device 101 to be changed from an unfolding state to a folding state. The hinge structure 1050 may enable the electronic device 101 to be changed from the folding state to the unfolding state. The hinge structure 1050 may maintain the electronic device 101 in an intermediate state between the unfolding state and the folding state.

For example, the unfolding state may be referred to as a state in which a first direction in which the first display area 1030*a* faces and a second direction in which the second display area 1030*b* faces are the same. For example, the folding state may be referred to as a state in which the first direction is opposite to the second direction. When the electronic device 101 is in the folding state, the first housing part 1010 and the second housing part 1020 may be laminated or overlapped.

For example, when the electronic device 101 is in the folding state and the intermediate state, the first direction and the second direction may be different from each other. For example, when the electronic device 101 is in the folding state, the first direction and the second direction may be opposite to each other. For example, when the electronic device 101 is in the intermediate state, the first direction may have a slope (e.g., an angle between 0 and 180 degrees) with respect to the second direction.

For example, the electronic device 101 may be rotatable based on a folding axis f. The folding axis f may be referred to as a virtual line extending along a direction (e.g., y-axis) parallel to a longitudinal direction of the electronic device 101 or a direction (e.g., x-axis) parallel to a width direction of the electronic device 101.

For example, the electronic device 101 may include at least one conductive portion 1014*a* and 1024*a* and at least one non-conductive portion 1014*b* and 1024*b* included in the first side surface 1013 and/or the second side surface 1023. For example, the at least one conductive portion 1014*a* and 1024*a* may be separated from another conductive portion within the first side surface 1013 and/or the second side surface 1023, by contacting with the at least one non-conductive portion 1014*b* and 1024*b*. The at least one conductive portion 1014*a* and 1024*a* may operate as an antenna radiator to be used for communication with an external electronic device.

Referring to FIG. 10C, the hinge structure 1050 may include a hinge cover 1051, a first hinge plate 1052, a second hinge plate 1053, and a hinge module 1054. The hinge cover 1051 may surround internal components of the hinge structure 1050 and define an outer surface of the hinge structure

1050. For example, when the electronic device 101 is in the folding state, at least a part of the hinge cover 1051 may be exposed to the outside of the electronic device 101 through the first housing part 1010 and the second housing part 1020. According to another embodiment, when the electronic device 101 is in the unfolding state, the hinge cover 1051 may be covered by the first housing part 1010 and the second housing part 1020 and may not be exposed to the outside of the electronic device 101.

For example, the first hinge plate 1052 and the second hinge plate 1053 may rotatably connecting the first housing part 1010 and the second housing part 1020, by being operably coupled to the first housing part 1010 and the second housing part 1020, respectively. For example, the first hinge plate 1052 may be operably coupled to a first support member 1015 of the first housing part 1010, and the second hinge plate 1053 may be operably coupled to a second support member 1027 of the second housing part 1020. As the first hinge plate 1052 and the second hinge plate 1053 are operably coupled to the first support member 1015 and the second support member 1027 respectively, the first housing part 1010 and the second housing part 1020 may be rotatable according to rotation of the first hinge plate 1052 and the second hinge plate 1053.

The hinge module 1054 may rotate the first hinge plate 1052 and the second hinge plate 1053. For example, the hinge module 1054 may rotate the first hinge plate 1052 and the second hinge plate 1053 based on the folding axis f, by including gears capable of being engaged and rotated.

For example, the first housing part 1010 may include the first support member 1015 and a rear cover 1016. The first support member 1015 may be disposed inside the first housing part 1010 and may support at least one component disposed in the first housing part 1010. The rear cover 1016 may define at least a part of the second surface 1012 of the first housing part 1010. For example, the second housing part 1020 may include the second support member 1027. The second support member 1027 may be disposed inside the second housing part 1020 and may support at least one component disposed in the second housing part 1020. For example, the sub-display 1035 may be disposed under the second support member 1027 (e.g., in the −z direction).

According to an exemplary embodiment, the electronic device 101 may include a plurality of electronic components for implementing various functions, in addition to the at least one camera 1040 described above. For example, the electronic device 101 may include a first printed circuit board 1061, a second printed circuit board 1062, a connection structure (e.g., a flexible printed circuit board) 1063, and/or a battery 189. The electronic components described above are illustrative only and are not limited thereto.

For example, the first printed circuit board 1061 and the second printed circuit board 1062 may provide electrical connection of components in the electronic device 101, respectively. For example, the first printed circuit board 1061 may be disposed in the first housing part 1010, and the second printed circuit board 1062 may be disposed in the second housing part 1020. The first printed circuit board 1061 may provide an electrical connection between electronic components disposed in the first housing part 1010. The second printed circuit board 1062 may provide an electrical connection between electronic components disposed in the second housing part 1020. The connection structure 1063 may electrically connect the first printed circuit board 1061 and the second printed circuit board 1062. For example, the connection structure 1063 may extend from the first printed circuit board 1061 to the second printed circuit board 1062 across the hinge structure 1050. For example, the connection structure 1063 may at least partially overlap the hinge structure 1050.

For example, the battery 189 may be a device for supplying power to at least one component of the electronic device 101, and may include a non-rechargeable primary battery and/or a rechargeable secondary battery.

For example, the electronic device 101 may include a plurality of antennas ANT1, ANT2, ANT3, and ANT4 to be used for communication with an external electronic device. For example, the electronic device 101 may include a main antenna ANT1, a sub-antenna ANT2, an ultra-wide band (UWB) antenna ANT3, and/or an antenna for near-field wireless communication ANT4. However, it is not limited thereto.

Figure 11A:
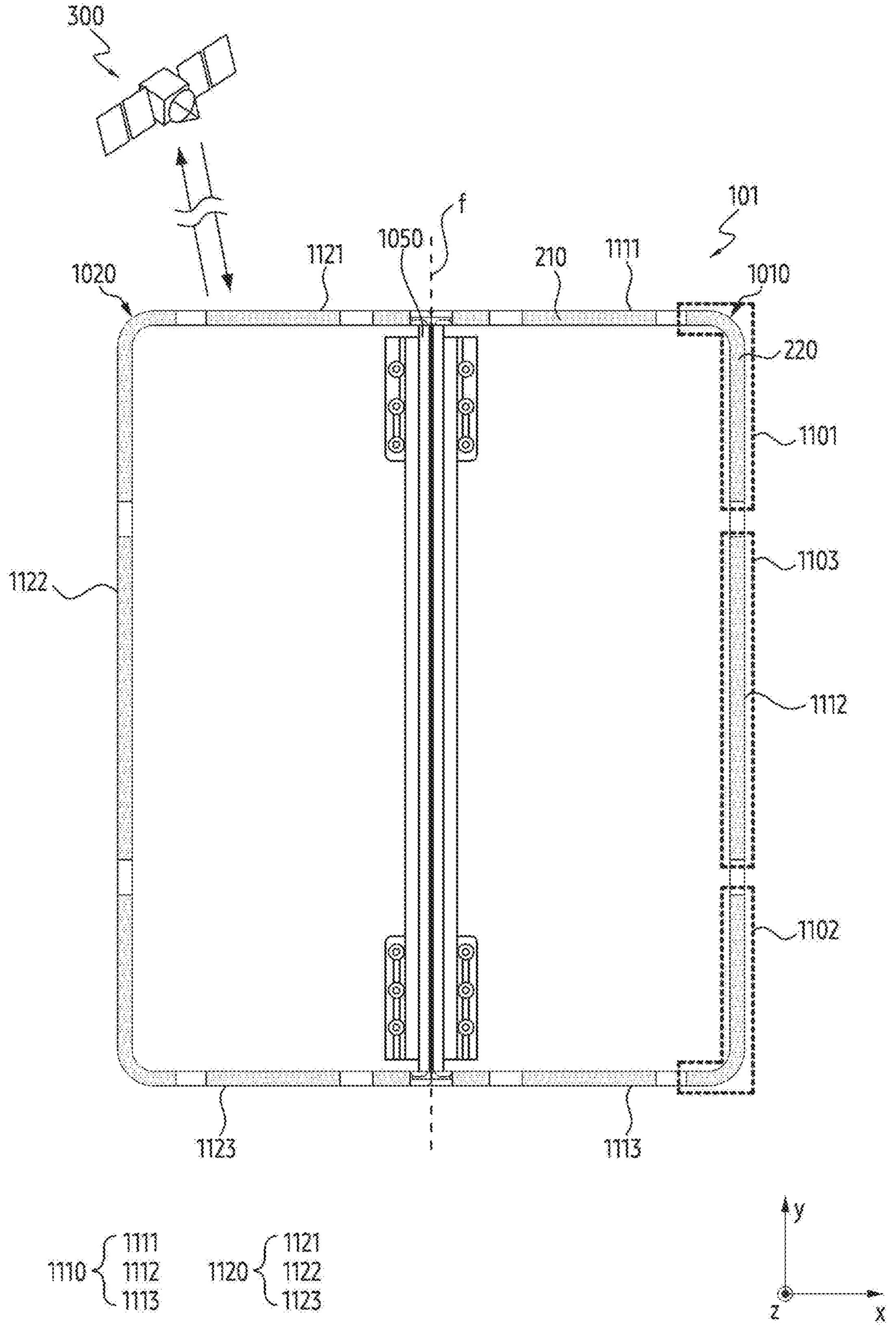
FIGS. 11A and 11B schematically illustrate an electronic device according to various embodiments of the disclosure.
Figure 11B:
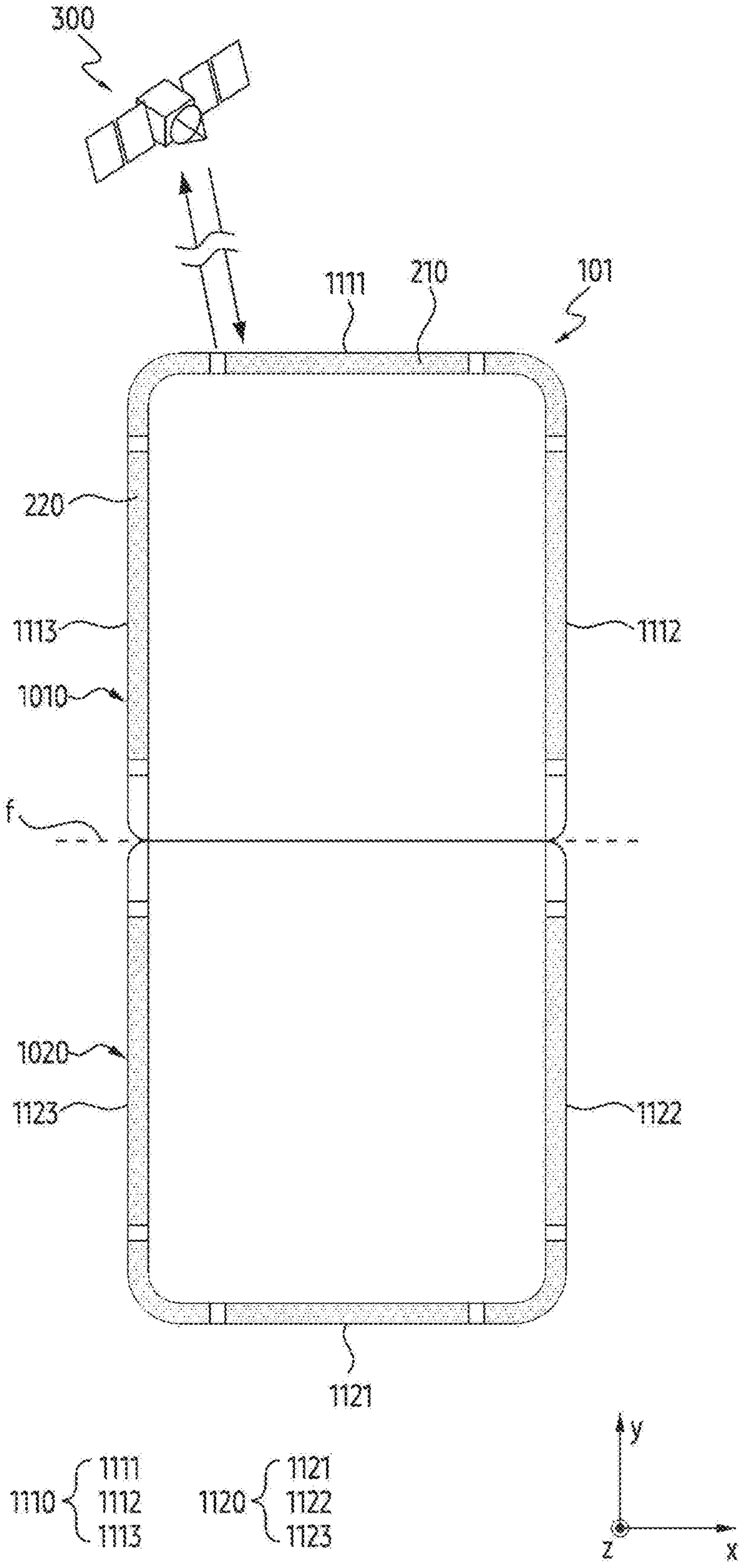

FIGS. 11A and 11B schematically illustrate an electronic device according to an exemplary embodiment.

Referring to FIG. 11A, according to an exemplary embodiment, the electronic device 101 may include a first housing part 1010 and a second housing part 1020. For example, the second housing part 1020 may be rotatably fastened to the first housing part 1010 based on a folding axis f. For example, the electronic device 101 may include a hinge structure 1050 rotatably connecting the first housing part 1010 and the second housing part 1020.

For example, the first housing part 1010 may include a first frame 1110 defining at least a part of a side surface of the first housing part 1010. For example, the first frame 1110 may include a conductive portion and a non-conductive portion. The conductive portion may operate as an antenna radiator for transmitting and/or receiving a signal on a designated frequency band (e.g., about 1.6 GHZ). The non-conductive portion may be in contact with both ends of the conductive portions operating as the antenna radiator, in order to electrically isolate the conductive portion operating as the antenna radiator from other conductive portions.

For example, the first frame 1110 may include a first edge portion 1111, a second edge portion 1112, and a third edge portion 1113. For example, the first frame 1110 may include the first edge portion 1111 defining at least a part of the upper (e.g., +y direction) of the first housing part 1010, the second edge portion 1112 defining at least a part of one side (e.g., +x direction) edge of the electronic device 101, and the third edge portion 1113 opposite to the first edge portion 1111. For example, the first edge portion 1111 and the third edge portion 1113 may be perpendicular to the second edge portion 1112. For example, a length of the second edge portion 1112 may be longer than a length of the first edge portion 1111. For example, the third edge portion 1113 may define at least a part of the bottom (e.g., −y direction) edge of the electronic device 101.

According to an exemplary embodiment, the electronic device 101 may include a first antenna 210 and a second antenna 220 for transmitting and/or receiving a signal in a designated frequency band (e.g., about 1.6 GHZ). For example, the first antenna 210 may be disposed substantially perpendicular to the second antenna 220. For example, the first antenna 210 may be at least partially formed along the first edge portion 1111 or the third edge portion 1113. For example, the second antenna 220 may be at least partially formed along the second edge portion 1112 or a fourth edge portion 1121. Since the first edge portion 1111 and the third edge portion 1113 are perpendicular to the second edge portion 1112, the first antenna 210 and the second antenna 220 may be disposed to substantially perpendicular. However, it is not limited thereto. For example, the first antenna 210 may be at least partially formed along the second edge portion 1112, and the second antenna 220 may be at least partially formed along the first edge portion 1111 or the third edge portion 1113. In order to implement circular polarization according to various embodiments of the disclosure, the first antenna 210 and the second antenna 220 merely have a structure disposed perpendicularly to each other, and locations of the first antenna 210 and the second antenna 220 are not limited to a specific edge portion.

For example, the second antenna 220 formed at least partially in the second edge portion 1112 may be disposed in a first location 1101 or a second location 1102 including a corner of the frame 230, or may be disposed in a third location 1103 spaced apart from a corner of the frame 230. In order to suppress occurrence of a grating lobe, a distance between the first antenna 210 and the second antenna 220 may be less than or equal to about ½ of a wavelength corresponding to an operating frequency (e.g., about 1.6 GHZ). For example, when the first antenna 210 is formed at least partially along the first edge portion 1111, the second antenna 220 may be disposed at the first location 1101 or the third location 1103. For example, when the first antenna 210 is formed at least partially along the third edge portion 1113, the second antenna 220 may be disposed at the second location 1102 or the third location 1103.

The location of the first antenna 210 and the location of the second antenna 220 described above are merely descriptions of the first antenna 210 and the second antenna 220 for radiating circular polarization, the electronic device 101 may further include other antennas different from the first antenna 210 and the second antenna 220. For example, when the first antenna 210 is formed at least partially along the first edge portion 1111, and the second antenna 220 is formed at least partially along a part of the second edge portion 1112, the electronic device 101 may include one or more other antennas formed at least partially along another part of the second edge portion 1112 and/or the third edge portion 1113. For example, one or more other antennas may be formed at least partially along the second frame 1120 forming at least a part of a side surface of the second housing part 1020. For example, the one or more other antennas formed at least partially along the second frame 1120 may be symmetrical with an antenna formed at least partially along the first frame 1110 based on the folding axis f. However, it is not limited thereto.

For example, the electronic device 101 may include at least one processor (e.g., the at least one processor 240 of FIG. 3), an RF transceiver (e.g., the RF transceiver 250 of FIG. 3), a phase shifter (e.g., the phase shifter 260 of FIG. 3), and at least one switch circuit (e.g., the at least one switch circuit 280 of FIG. 3) described above. The above-described descriptions may be applied in substantially the same manner with respect to the components. For example, the at least one switch circuit 280 may be configured to selectively provide the first connection state or the second connection state. For example, the first connection state may be referred to as a state illustrated in FIG. 4A, and the second connection state may be referred to as a state illustrated in FIG. 4C.

For example, in the first connection state, the first antenna 210 and the second antenna 220 may be configured to radiate circular polarization. The circular polarization may be implemented based on a difference between a phase of a signal inputted to the first antenna 210 and a phase of a signal inputted to the second antenna 220 passing through the phase shifter 260. For example, when the first antenna 210 and the second antenna 220 communicate with an external electronic device (e.g., the satellite 300), satellite communication efficiency of the electronic device 101 may be improved by radiating circular polarization.

For example, the at least one processor 240 may be configured to control the at least one switch circuit 280, based on a first receiving quality of a first signal received through the first antenna 210 and the second antenna 220 in the first connection state and a second receiving quality of a second signal received through the first antenna 210 and the second antenna 220 in the second connection state. For example, the at least one processor 240 may be configured to control the at least one switch circuit 280 to the first connection state, based on identifying that the first receiving is quality higher than the second receiving quality. For example, the at least one processor 240 may be configured to control the at least one switch circuit 280 to the second connection state, based on identifying that the second receiving quality is higher than the first receiving quality. For example, the electronic device 101 may improve satellite communication efficiency by identifying a state with high satellite communication efficiency and performing satellite communication based on the identified state.

For example, the electronic device 101 may have a structure in which an edge portion (e.g., the second edge portion 1112 and the fifth edge portion 1122) parallel to the folding axis f is longer than an edge portion (e.g., the first edge portion 1111, the third edge portion 1113, the fourth edge portion 1121, and sixth edge portion 1123) perpendicular to the folding axis f. However, it is not limited thereto. As illustrated in FIG. 11B, an edge portion parallel to the folding axis f may also have a structure shorter than an edge portion perpendicular to the folding axis f.

Referring to FIG. 11B, the electronic device 101 may include a housing with a structure in which the edge portion perpendicular to the folding axis f is longer than the edge portion parallel to the folding axis f. For example, the housing may include the first housing part 1010 and the second housing part 1020 rotatably coupled to the first housing part 1010.

For example, the first housing part 1010 may include the first frame 1110 defining at least a part of a side surface of the first housing part 1010 and a second frame 1120 defining at least a part of a side surface of the second housing part 1020. For example, the first frame 1110 and the second frame 1120 may include a conductive portion and a non-conductive portion. The conductive part may operate as an antenna radiator for transmitting and/or receiving a signal in a designated frequency band (e.g., about 1.6 GHZ).

For example, the first frame 1110 may include the first edge portion 1111, the second edge portion 1112, and the third edge portion 1113. For example, the frame 1110 may include the first edge portion 1111 defining at least a part of the upper (e.g., +y direction) edge of the first housing part 1010, the second edge portion 1112 defining at least a part of one side (e.g., +x direction) edge of the electronic device 101, and the third edge portion 1113 defining at least a part of another side (e.g., −x direction) edge of the electronic device 101. For example, the first edge portion 1111 may be perpendicular to the second edge portion 1112 and the third edge portion 1113. For example, a length of the second edge portion 1112 and the third edge portion 1113 may be longer than a length of the first edge portion 1111.

For example, the second frame 1120 may include the fourth edge portion 1121, the fifth edge portion 1122, and the sixth edge portion 1123. For example, the second frame 1120 may include the fourth edge portion 1121 defining at least a part of the bottom (e.g., −y direction) edge of the second housing part 1020, the fifth edge portion 1122 defining at least a part of one side (e.g., +x direction) edge of the electronic device 101, and the sixth edge portion 1123 defining at least a part of another side (e.g., −x direction) edge of the electronic device 101. For example, the fourth edge portion 1121 may be perpendicular to the fifth edge portion 1122 and the sixth edge portion 1123. For example, a length of the fifth edge portion 1122 and the sixth edge portion 1123 may be longer than a length of the fourth edge portion 1121.

For example, the electronic device 101 may include the first antenna 210 and the second antenna 220. For example, the first antenna 210 may be disposed perpendicular to the second antenna 220. For example, a distance between the first antenna 210 and the second antenna 220 may be less than or equal to about ½ of a wavelength corresponding to an operating frequency (e.g., about 1.6 GHZ) in order to suppress occurrence of a grating robe.

For example, the first antenna 210 may be formed at least partially along the first edge portion 1111. For example, the second antenna 220 may be formed at least partially along the second edge portion 1112 or the third edge portion 1113. However, it is not limited thereto. For example, the first antenna 210 may be formed at least partially along the fourth edge portion 1121. For example, the second antenna 220 may be formed at least partially along the fifth edge portion 1122 or the sixth edge portion 1123. The first antenna 210 and the second antenna 220 of the electronic device 101 illustrated in FIGS. 11A and 11B may be configured to radiate circular polarization (e.g., RHCP).

An electronic device 101 is provided. The electronic device may include at least one processor 240 comprising processing circuitry, memory 130 storing instructions executable by the at least one processor 240 and causing the electronic device 101 to perform operations, a first antenna 210, a second antenna 220, a radio frequency (RF) transceiver 250, a phase shifter 260 electrically connected to the second antenna 220, a power branch circuit 270, and at least one switch circuit 280 configured to selectively provide a first connection state or a second connection state. In the first connection state, a first path P1 may be formed for electrically connecting the RF transceiver 250, the power branch circuit 270 and the first antenna 210, and a second path P2 may be formed for electrically connecting the RF transceiver 250, the power branch circuit 270, the phase shifter 260, and the second antenna 220. In the second connection state, a third path P3 may be formed for electrically connecting the RF transceiver 250 and the first antenna 210 by bypassing the power branch circuit 270, and a fourth path P4 may be formed for electrically connecting the RF transceiver 250, the phase shifter 260, and the second antenna 220, bypassing the power branch circuit 270. The at least one processor 240 may be configured to control the at least one switch circuit 280 such that the at least one switch circuit 280 provides the first connection state or the second connection state, based on a first receiving quality of a first signal received through the first antenna 210 and the second antenna 220 in the first connection state and a second receiving quality of a second signal received through the first antenna 210 and the second antenna 220 in the second connection state.

For example, the at least one switch circuit 280 may include a first switch circuit 281 for electrically connecting the first antenna 210 or the power branch circuit 270 to the RF transceiver 250, a second switch circuit 282 for electrically connecting the first switch circuit 2881 or the power branch circuit 270 to the first antenna 210, and a third switch circuit 283 for electrically connecting the RF transceiver 250 or the power branch circuit 270 to the second antenna 220.

For example, the at least one processor 240 may be configured to control the at least one switch circuit 280 to provide the first connection state, based on connecting the RF transceiver 250 and the power branch circuit 270 through the first switch circuit 281, connecting the power branch circuit 270 and the first antenna 210 through the second switch circuit 282, and connecting the power branch circuit 270 and the second antenna 220 through the third switch circuit 283. The at least one processor 240 may be configured to control the at least one switch circuit 280 to provide the second connection state, based on connecting the RF transceiver 250 and the second switch circuit 282 through the first switch circuit 281, connecting the first switch circuit 281 and the first antenna 210 through the second switch circuit 282, and connecting the second antenna 220 and the RF transceiver 250 through the third switch circuit 283.

For example, the first antenna 210 and the second antenna 220 may be configured to radiate circular polarization, based on a phase difference between a phase of a signal before passing through the phase shifter 260 and a phase of a signal after passing through the phase shifter 260 in the first connection state.

For example, the circular polarization may be right-handed circular polarization (RHCP).

For example, the first antenna 210 may be configured to operate as a primary antenna for transmitting or receiving a signal on a designated frequency band in the second connection state. The second antenna 220 may be configured to operate as a diversity antenna for transmitting or receiving the signal on the designated frequency band in the second connection state.

For example, the designated frequency band may include a satellite communication frequency band.

For example, the at least one processor 240 may be configured to control the at least one switch circuit 280 to provide the first connection state while transmitting a signal to an external electronic device. The at least one processor 240 may be configured to identify the first receiving quality and the second receiving quality based on identifying the transmission of the signal. The at least one processor 240 may be configured to control the at least one switch circuit 280 to provide the first connection state or the second connection state based on the first receiving quality and the second receiving quality.

For example, the at least one processor 240 may be configured to control the at least one switch circuit 280 to the first connection state based on identifying that the first receiving quality is higher than the second receiving quality. The at least one processor 240 may be configured to control the at least one switch circuit 280 to the second connection state based on identifying that the second receiving is quality higher than the first receiving quality.

For example, the at least one processor 240 may be configured to control the RF transceiver 250 to transmit a transmission signal to an external electronic device based on execution of an application for transmitting a signal to the external electronic device.

For example, the electronic device 101 may further comprise at least one display 290. The at least one processor 240 may be configured to identify a location of the external electronic device. The at least one processor 240 may be configured to display a visual object guiding a posture of the electronic device 101 in which the first antenna 210 and the second antenna 220 face the external electronic device through the at least one display 290, based on a location of the external electronic device.

For example, the electronic device 101 may further comprise a frame 230 defining at least a part of a side exterior surface of the electronic device 101. The first antenna 210 may be at least partially formed along a first edge portion 231 of the frame 230. The second antenna 220 may be at least partially formed along a second edge portion 232 of the frame 230.

For example, the second edge portion 232 may be perpendicular to the first edge portion 231. The second edge portion 232 may be longer than the first edge portion 231.

For example, a distance between the first antenna 210 and the second antenna 220 may be less than equal to ½ of a wavelength corresponding to an operating frequency of the first antenna 210 and the second antenna 220.

For example, the electronic device 101 may further comprise a housing 1001 including a first housing part 1010 including a frame 1110 defining at least a part of a side surface of the electronic device 101, and a second housing part 1020 rotatably coupled to the first housing part 1010. The first antenna 210 may be at least partially formed along a first edge portion 231 of the frame 1110. The second antenna 220 may be at least partially formed along a second edge portion 232 of the frame 1110 perpendicular to the first edge portion 231.

An electronic device 101 is provided. The electronic device 101 may comprise at least one processor 240 comprising processing circuitry, memory 130 storing instructions executable by the at least one processor 240 and causing the electronic device 101 to perform operations, a housing 1001 including a first housing part 1010 and a second housing part 1020 rotatably coupled to the first housing part 1010, a frame 1110 defining at least a part of a side surface of the first housing part 1010, a first antenna 210 at least partially formed along a first edge portion 231 of the frame 1110, a second antenna 220 at least partially formed along a second edge portion 232 of the frame 1110 perpendicular to the first edge portion 231, a radio frequency (RF) transceiver 250, a phase shifter 260 electrically connected to the second antenna 220, a power branch circuit 270, and at least one switch circuit 280 configured to selectively provide a first connection state or a second connection state. The at least one processor 240 may be configured to control the at least one switch circuit 280 such that the at least one switch circuit 280 provides the first connection state including a first path P1 for electrically connecting the RF transceiver 250, the power branch circuit 270 and the first antenna 210, and a second path P2 for electrically connecting the RF transceiver 250, the power branch circuit 270, the phase shifter 260, and the second antenna 220. The at least one processor 240 may be configured to control the at least one switch circuit 280 such that the at least one switch circuit 280 provides the second connection state including a third path P3 for electrically connecting the RF transceiver 250 and the first antenna 210 by bypassing the power branch circuit 270, and a fourth path P4 for electrically connecting the RF transceiver 250, the phase shifter 260, and the second antenna 220, bypassing the power branch circuit 270.

For example, the at least one processor 240 may be configured to control the at least one switch circuit 280 such that the at least one switch circuit 280 provides the first connection state or the second connection state, based on a first receiving quality of a first signal received through the first antenna 210 and the second antenna 220 in the first connection state and a second receiving quality of a second signal received through the first antenna 210 and the second antenna 220 in the second connection state.

For example, the at least one switch circuit 280 may include a first switch circuit 281 for electrically connecting the first antenna 210 or the power branch circuit 270 to the RF transceiver, a second switch circuit 282 for electrically connecting the first switch circuit 281 or the power branch circuit 270 to the first antenna 210, and a third switch circuit 283 for electrically connecting the RF transceiver or the power branch circuit 270 to the second antenna 220.

For example, the at least one processor 240 may be configured to control the at least one switch circuit to provide the first connection state, based on connecting the RF transceiver and the power branch circuit 270 through the first switch circuit 281, connecting the power branch circuit 270 and the first antenna 210 through the second switch circuit 282, and connecting the power branch circuit 270 and the second antenna 220 through the third switch circuit 283. The at least one processor 240 may be configured to control the at least one switch circuit to provide the second connection state, based on connecting the RF transceiver and the second switch circuit 282 through the first switch circuit 281, connecting the first switch circuit 281 and the first antenna 210 through the second switch circuit 282, and connecting the second antenna 220 and the RF transceiver 250 through the third switch circuit 283.

For example, the first antenna 210 and the second antenna 220 may be configured to radiate circular polarization, based on a phase difference between a phase of a signal before passing through the phase shifter 260 and a phase of a signal after passing through the phase shifter 260 in the first connection state.

A method performed by an electronic device 101 is provided. The method may comprise controlling, while transmitting a signal to an external electronic device, at least one switch circuit 280 to provide a first connection state forming a first path P1 for electrically connecting an RF transceiver 250, a power branch circuit 270 and a first antenna 210, and a second path P2 for electrically connecting the RF transceiver 250, the power branch circuit 270, a phase shifter 260, and a second antenna 220; identifying a first receiving quality of a first signal received through the first antenna 210 and the second antenna 220 in the first connection state, based on identifying transmission of the signal; controlling at least one switch circuit 280 to provide a second connection state forming a third path P3 for electrically connecting the RF transceiver 250 and the first antenna 210 by bypassing the power branch circuit 270, and a fourth path P4 for electrically connecting the RF transceiver 250, the phase shifter 260, and the second antenna 220, bypassing the power branch circuit 270; identifying a second receiving quality of a second signal received through the first antenna 210 and the second antenna 220 in the second connection state; and controlling the at least one switch circuit 280 such that the at least one switch circuit 280 provides the first connection state or the second connection state based on the first receiving quality and the second receiving quality.

For example, the method may further comprise controlling the at least one switch circuit to provide the first connection state based on identifying that the first receiving quality is higher than the second receiving quality, and controlling the at least one switch circuit to provide the second connection state based on identifying that the second receiving quality is higher than the first receiving quality.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

at least one processor comprising processing circuitry;

memory storing instructions being executable by the at least one processor;

a first antenna;

a second antenna;

a radio frequency (RF) transceiver;

a phase shifter electrically connected to the second antenna;

a power branch circuit; and at least one switch circuit configured to selectively provide a first connection state or a second connection state, wherein in the first connection state:

a first path is formed for electrically connecting the RF transceiver, the power branch circuit and the first antenna, and a second path is formed for electrically connecting the RF transceiver, the power branch circuit, the phase shifter, and the second antenna, wherein in the second connection state:

a third path is formed for electrically connecting the RF transceiver and the first antenna by bypassing the power branch circuit, and a fourth path is formed for electrically connecting the RF transceiver, the phase shifter, and the second antenna, bypassing the power branch circuit, and wherein the instructions, when executed by the at least one processor, cause the electronic device to:

control the at least one switch circuit such that the at least one switch circuit provides the first connection state or the second connection state, based on:

a first receiving quality of a first signal received through the first antenna and the second antenna in the first connection state, and a second receiving quality of a second signal received through the first antenna and the second antenna in the second connection state.

2. The electronic device of claim 1, wherein the at least one switch circuit includes:

a first switch circuit for electrically connecting the first antenna or the power branch circuit to the RF transceiver;

a second switch circuit for electrically connecting the first switch circuit or the power branch circuit to the first antenna; and a third switch circuit for electrically connecting the RF transceiver or the power branch circuit to the second antenna.

3. The electronic device of claim 2, wherein the instructions, when executed by the at least one processor, cause the electronic device to:

control the at least one switch circuit to provide the first connection state, based on:

connecting the RF transceiver and the power branch circuit through the first switch circuit, connecting the power branch circuit and the first antenna through the second switch circuit, and connecting the power branch circuit and the second antenna through the third switch circuit; and control the at least one switch circuit to provide the second connection state, based on:

connecting the RF transceiver and the second switch circuit through the first switch circuit, connecting the first switch circuit and the first antenna through the second switch circuit, and connecting the second antenna and the RF transceiver through the third switch circuit.

4. The electronic device of claim 1, wherein the first antenna and the second antenna are configured to radiate circular polarization, based on:

a phase difference between a phase of a signal before passing through the phase shifter, and a phase of a signal after passing through the phase shifter in the first connection state.

5. The electronic device of claim 4, wherein the circular polarization is right-handed circular polarization (RHCP).

6. The electronic device of claim 1, wherein the first antenna is configured to operate as a primary antenna for transmitting or receiving a signal on a designated frequency band in the second connection state, and wherein the second antenna is configured to operate as a diversity antenna for transmitting or receiving the signal on the designated frequency band in the second connection state.

7. The electronic device of claim 6, wherein the designated frequency band includes a satellite communication frequency band.

8. The electronic device of claim 1, wherein the instructions, when executed by the at least one processor, cause the electronic device to:

control the at least one switch circuit to provide the first connection state while transmitting a signal to an external electronic device;

identify the first receiving quality and the second receiving quality based on identifying the transmission of the signal; and control the at least one switch circuit to provide the first connection state or the second connection state based on the first receiving quality and the second receiving quality.

9. The electronic device of claim 8, wherein the instructions, when executed by the at least one processor, cause the electronic device to:

control the at least one switch circuit to provide the first connection state based on identifying that the first receiving quality is higher than the second receiving quality; and control the at least one switch circuit to provide the second connection state based on identifying that the second receiving quality is higher than the first receiving quality.

10. The electronic device of claim 1, wherein the instructions, when executed by the at least one processor, cause the electronic device to:

control the RF transceiver to transmit a transmission signal to an external electronic device based on execution of an application for transmitting a signal to the external electronic device.

11. The electronic device of claim 10, further comprising:

at least one display, wherein the instructions, when executed by the at least one processor, cause the electronic device to:

display a visual object guiding a posture of the electronic device with the first antenna and the second antenna facing the external electronic device through the at least one display, based on a location of the external electronic device.

12. The electronic device of claim 1, further comprising:

a frame defining at least a part of a side exterior surface of the electronic device, wherein the first antenna is at least partially formed along a first edge portion of the frame, and wherein the second antenna is at least partially formed along a second edge portion of the frame.

13. The electronic device of claim 12, wherein the second edge portion is perpendicular to the first edge portion and is longer than the first edge portion.

14. The electronic device of claim 1, wherein a distance between the first antenna and the second antenna is less than or equal to ½ of a wavelength corresponding to an operating frequency of the first antenna and the second antenna.

15. The electronic device of claim 1, further comprising:

a housing including:

a first housing part including a frame defining at least a part of a side surface of the electronic device, and a second housing part rotatably coupled to the first housing part, wherein the first antenna is at least partially formed along a first edge portion of the frame, and wherein the second antenna is at least partially formed along a second edge portion of the frame perpendicular to the first edge portion.

16. An electronic device comprising:

at least one processor comprising processing circuitry;

memory storing instructions being executable by the at least one processor;

a housing including a first housing part and a second housing part rotatably coupled to the first housing part;

a frame defining at least a part of a side surface of the first housing part;

a first antenna at least partially formed along a first edge portion of the frame;

a second antenna at least partially formed along a second edge portion of the frame perpendicular to the first edge portion;

a radio frequency (RF) transceiver;

a phase shifter electrically connected to the second antenna;

a power branch circuit; and at least one switch circuit configured to selectively provide a first connection state or a second connection state, wherein the instructions, when executed by the at least one processor, cause the electronic device to:

control the at least one switch circuit such that the at least one switch circuit provides the first connection state including:

a first path for electrically connecting the RF transceiver, the power branch circuit and the first antenna, and a second path for electrically connecting the RF transceiver, the power branch circuit, the phase shifter, and the second antenna, and control the at least one switch circuit such that the at least one switch circuit provides the second connection state including:

a third path for electrically connecting the RF transceiver and the first antenna by bypassing the power branch circuit, and a fourth path for electrically connecting the RF transceiver, the phase shifter, and the second antenna, bypassing the power branch circuit.

17. The electronic device of claim 16, wherein the instructions, when executed by the at least one processor, cause the electronic device to:

control the at least one switch circuit such that the at least one switch circuit provides the first connection state or the second connection state, based on a first receiving quality of a first signal received through the first antenna and the second antenna in the first connection state, and a second receiving quality of a second signal received through the first antenna and the second antenna in the second connection state.

18. The electronic device of claim 16, wherein the at least one switch circuit includes:

a first switch circuit for electrically connecting the first antenna or the power branch circuit to the RF transceiver;

a second switch circuit for electrically connecting the first switch circuit or the power branch circuit to the first antenna; and a third switch circuit for electrically connecting the RF transceiver or the power branch circuit to the second antenna.

19. The electronic device of claim 18, wherein the instructions, when executed by the at least one processor, cause the electronic device to:

control the at least one switch circuit to provide the first connection state, based on:

connecting the RF transceiver and the power branch circuit through the first switch circuit, connecting the power branch circuit and the first antenna through the second switch circuit, and connecting the power branch circuit and the second antenna through the third switch circuit; and control the at least one switch circuit to provide the second connection state, based on:

connecting the RF transceiver and the second switch circuit through the first switch circuit, connecting the first switch circuit and the first antenna through the second switch circuit, and connecting the second antenna and the RF transceiver through the third switch circuit.

20. The electronic device of claim 16, wherein the first antenna and the second antenna are configured to radiate circular polarization, based on:

a phase difference between a phase of a signal before passing through the phase shifter, and a phase of a signal after passing through the phase shifter in the first connection state.

* * * * *